(12) United States Patent
Sion

(10) Patent No.: US 12,073,007 B2
(45) Date of Patent: Aug. 27, 2024

(54) COMPUTER SERVER DEVICE AND METHODS FOR INITIATING AND RUNNING A COMPUTER PROCESS

(71) Applicant: PRIVATE MACHINES INC., Brooklyn, NY (US)

(72) Inventor: Radu Sion, Brooklyn, NY (US)

(73) Assignee: Private Machines Inc., Brooklyn, NY (US)

(*) Notice: Subject to any disclaimer, the term of this patent is extended or adjusted under 35 U.S.C. 154(b) by 1034 days.

(21) Appl. No.: 16/753,574

(22) PCT Filed: Sep. 17, 2018

(86) PCT No.: PCT/IB2018/057103
§ 371 (c)(1),
(2) Date: Apr. 3, 2020

(87) PCT Pub. No.: WO2019/069159
PCT Pub. Date: Apr. 11, 2019

(65) Prior Publication Data
US 2020/0293697 A1     Sep. 17, 2020

Related U.S. Application Data

(60) Provisional application No. 62/569,471, filed on Oct. 6, 2017.

(51) Int. Cl.
*G06F 21/87*     (2013.01)
*G06F 9/455*     (2018.01)
(Continued)

(52) U.S. Cl.
CPC .......... *G06F 21/87* (2013.01); *G06F 9/45558* (2013.01); *G06F 21/53* (2013.01);
(Continued)

(58) Field of Classification Search
CPC ...... G06F 21/87; G06F 9/45558; G06F 21/53; G06F 2009/45587; G06F 2009/45595;
(Continued)

(56) References Cited

U.S. PATENT DOCUMENTS

2009/0300719 A1     12/2009   Ferris
2010/0146304 A1*    6/2010    Miyatake ................ G06F 21/52
                                                              713/194

(Continued)

FOREIGN PATENT DOCUMENTS

WO     2016099644 A1     6/2016
WO     2016137573 A1     9/2016

*Primary Examiner* — Bruce S Ashley
(74) *Attorney, Agent, or Firm* — The Law Office of Daniel T. Weglarz, P.C.

(57) ABSTRACT

Computer server device (690) comprising a server control unit (600) and at least one physical connectors (605) for respective physical tamper-protected computer modules (80), which tamper-protected computer modules (SO) each comprises a respective tamper-protected enclosure (162), a respective module control unit and a respective information processing module (128), which module control unit and information processing module (128) are both entirely enclosed by said tamper-protected enclosure (162) in question. The invention is characterised in that the server control unit (600) is arranged to expose a digital virtualization interface (610) on a network to which the computer server device (690) is connected, providing access to other devices on said network to a respective virtual computer device corresponding to each tamper-protected computer module (80) which is connected to the server control unit (690), and in that the server control unit (600) is arranged to receive calls directed to each such virtual computer device, to produce corresponding calls to a corresponding tamper-protected computer module (80) and to, via said digital virtualization interface, deliver such corresponding calls to (Continued)

the corresponding tamper-protected computer module (80) in question. The invention also relates to a method, a computer software program and an interface.

23 Claims, 13 Drawing Sheets

(51) Int. Cl.
*G06F 21/53* (2013.01)
*H04L 9/00* (2022.01)

(52) U.S. Cl.
CPC .... *H04L 9/006* (2013.01); *G06F 2009/45587* (2013.01); *G06F 2009/45595* (2013.01); *G06F 2221/033* (2013.01)

(58) Field of Classification Search
CPC ... G06F 2221/033; G06F 21/86; H04L 9/006; H04L 67/10; H04L 63/10
See application file for complete search history.

(56) References Cited

U.S. PATENT DOCUMENTS

| | | | |
|---|---|---|---|
| 2010/0325628 A1 | 12/2010 | Haga et al. | |
| 2014/0040576 A1* | 2/2014 | Cordero | G06F 12/0646 711/E12.103 |
| 2015/0229645 A1 | 8/2015 | Keith et al. | |
| 2015/0358313 A1* | 12/2015 | Hussain | H04L 63/0823 713/173 |
| 2016/0321276 A1* | 11/2016 | Oliver | G06F 16/27 |
| 2017/0116830 A1* | 4/2017 | Isaacs | G08B 13/128 |

\* cited by examiner

COMPUTER SERVER DEVICE AND METHODS FOR INITIATING AND RUNNING A COMPUTER PROCESS

The present invention relates to a computer server device. In particular, the invention relates to a computer server device arranged to manage one or several tamper-protected computer modules or devices. The invention also relates to methods for initiating and running a computer process on such a computer server device, and also to computer software code arranged to be run on such a computer server device and a digital computer interface arranged to be provided by such a computer server device.

Electronic devices that store sensitive information can easily fall into the wrong hands. To access internally-stored information, malicious parties may mount electronic-based attacks or various physical attacks, including removal of covers, removal of any potting, identification of the location and function of any existing security defenses, or bypassing of such defenses to gain access to the next layer of protection, to name a few.

One solution to this problem is to provide an anti-tamper system that encapsulates the core processing circuitry (CPC) that performs the system's information processing functionality in a security enclosure. For purposes of this disclosure, the term "anti-tamper" or "tamper-protected" may mean tamper resistant, tamper proof, tamper evident, tamper respondent, and the like, or any combination thereof. Throughout this disclosure, the terms "anti-tamper system," "anti-tamper device," and "anti-tamper enclosure" are used interchangeably, and the corresponding is true regarding "tamper-protection".

For example, a "tamper-respondent" device may be arranged to react to illicit attacks. Typically, such a device includes the use of a strong physical enclosure and tamper-detection or tamper-response circuitry that zeroes out stored critical security parameters (CSPs) during a tampering attempt, i.e., when a compromise of the device's security is detected.

The information processing functionality of many existing anti-tamper devices center around cryptographic operations as such, as opposed to general-purpose functions.

To the contrary, WO 2016/137573 A1 discloses a tamper-protected unit under the name "ENFORCER blade" (80), which is a tamper-protected computer module featuring a modular design. It provides a tamper-protected enclosure that can protect and connect off-the-shelf general-purpose motherboards through an Internal IPM (Information Processing Module) Decoupler component (136). This results in a cost-effective design that can be mass-produced and reused to protect different general-purpose off-the-shelf motherboards, across multiple generations and builds, using the same anti-tamper enclosure design, without the need for re-certification. Only the tamper-protected computer module, which stays the same even after a change of IPM, needs such classification.

It would be desirable to integrate such a modular, cost-effective and secure tamper-protected computation module into a conventional cloud or data center architecture, which is usually composed of servers. Such integration should at best be easily performed and without requiring any modifications to existing infrastructure, hardware and management softIs ware.

Hence, it would be desirable to integrate such a tamper-protected module in a conventional server rack environment, where remote users should be able to use such modules in a standard way, using standard software solutions allowing seamless integration into existing standard data center workflows.

The present invention solves these problems.

Hence, the invention relates to a computer server device (comprising a server control unit and at least two physical connectors for respective physical tamper-protected computer modules, which tamper-protected computer modules each comprises a respective tamper-protected enclosure, a respective module control unit and a respective information processing module, which module control unit and information processing module are both entirely enclosed by said tamper-protected enclosure in question, which computer server device is characterised in that the server control unit is arranged to expose a digital virtualization interface on a network to which the computer server device is connected, providing access to other devices on said network to a respective virtual computer device corresponding to each tamper-protected computer module which is connected to the server control unit, and in that the server control unit is arranged to receive calls directed to each such virtual computer device, to produce corresponding calls to a corresponding tamper-protected computer module and to, via said digital virtualization interface, deliver such corresponding calls to the corresponding tamper-protected computer module in question.

Moreover, the invention relates to a method for initiating a computer process in a tamper-protected environment, which method is characterised in that the method comprises the steps of a) providing a computer server device of the said type; b) providing at least one tamper-protected computer module and connecting it to one of said physical connections; c) the computer server device receiving, via its virtualization interface, an allocation request from the network to which it is connected; and d) the computer server device allocating the said tamper-protected computer module.

Furthermore, the invention relates to a computer software program arranged to execute on a computer server device of the above type, which computer software program is characterised in that the computer software program comprises functionality for communicating with at least one tamper-protected computer module, each connected to the computer server device via a respective physical connection and each comprising a respective module control unit and a respective information processing module, in that the computer software program is arranged to, when executed, expose a digital virtualization interface on a network to which the computer server device is connected, providing access for other devices on said network to a respective virtual computer device corresponding to each of the said tamper-protected computer modules, and in that the computer software program is arranged to receive calls directed to each such virtual computer device, to produce corresponding calls to a corresponding tamper-protected computer module and to deliver such corresponding calls to the corresponding tamper-protected computer module in question. Also, the invention relates to a digital computer interface, which digital computer interface is characterised in that the digital computer interface comprises an externally exposed interface part, arranged to provide, to external parties, communication services performed by at least one virtual computer device, and an internally exposed interface part, arranged to communicate with at least one physical tamper-protected computer module each corresponding to a respective one of said virtual computer devices, and in that the digital computer interface further comprises a virtualization part, arranged to receive, via said externally exposed interface part, calls directed to any one of said virtual computer devices, to produce corresponding calls to a corresponding tamper-protected computer module in question and to deliver, via said internally exposed interface part, such corresponding calls to the corresponding tamper-protected computer module in question.

In the following, the invention will be described in detail, with reference to exemplifying embodiments of the invention and to the enclosed drawings, wherein:

FIG. 17 shows export and migration of key management information.

Figure 1:
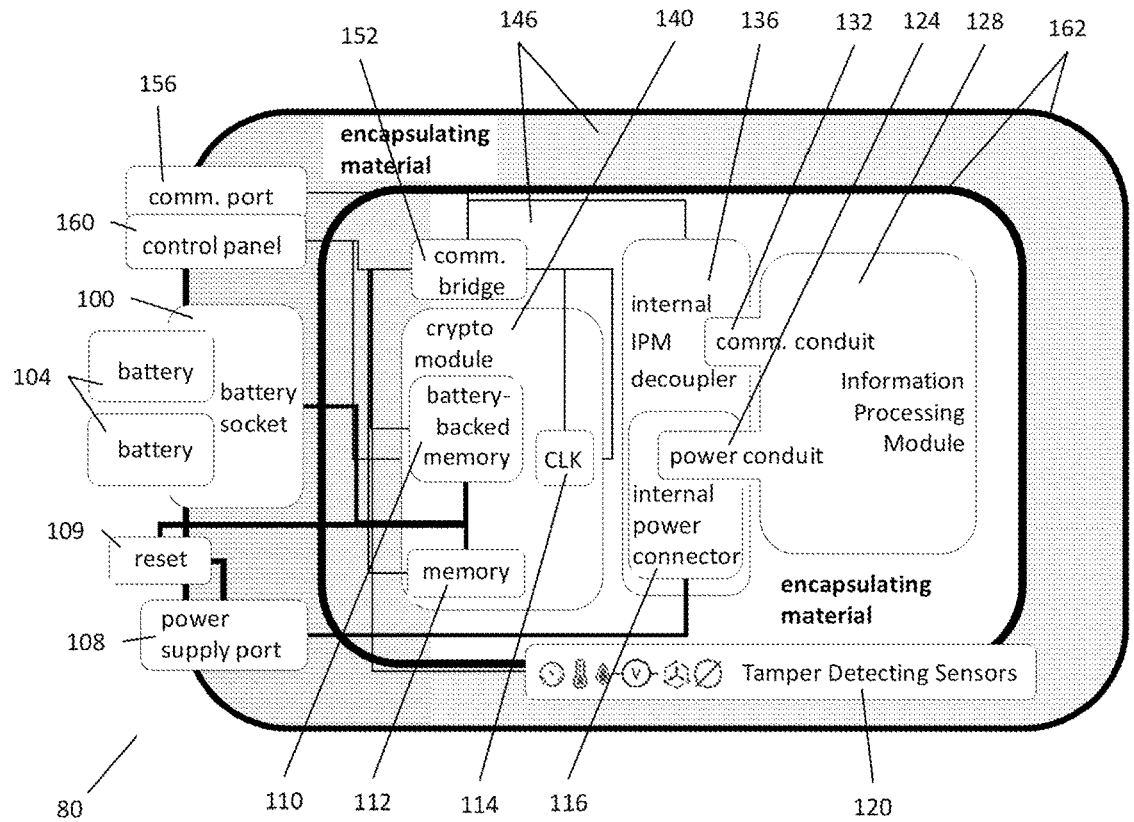
FIGS. 1, 2, 3 and 4 are respective schematic views of different prior art tamper-protected computer module, each of which is useful for use in a computer service device according to the invention.

It is noted that all FIGS. 1-14 illustrate respective functional representations of various systems and devices. However, in general the respective representations are also structural, as applicable. Hence, as long as it is not clear from the context that illustrated parts are purely functional, any discrete part shown in the FIGS. 1-14 may in general be a physically discrete part.

FIGS. 1-4 illustrate respective examples of tamper-protected computer modules 80 of the general type described in WO 2016/137573 A1 and denoted "ENFORCER blade" therein. These, and in fact all, Figures share the same reference numerals for same or corresponding parts.

Hence, the tamper-protected computer module 80 comprises one or more layers of encapsulating material 146, within one or more enclosing layers 162. Integrated within at least one of said enclosing layers 162 there are tamper-detecting sensors 120, as well as a number of components including: an information processing module (IPM) 128, internal power connectors 116, IPM connectors (or decouplers) 136, communication circuitry ("communication bridge") 152, a cryptographic module 140 (also named "security anchor" in the following), a clock component 114, a digital memory component 112 and a battery-backed memory component 110.

The IPM 128 in turn comprises a communication conduit 132, arranged to provide a digital wired communication interface to the tamper-protected computer module 80 inside which the IPM 182 sits, and a power conduit 124, arranged to receive power from said module 80.

The tamper-protected computer module 80 also comprises a number of externally accessible connectors, including a communication port 156 (e.g., Ethernet 10 Gbps connector), a control panel 160, a battery socket 100 (which may be arranged with batteries 104), a digital IPM communication port 480 (see FIG. 3), such as a serial port, an IPM status port 482, a crypto module status port 484, a battery status port 486, a temperature port 488, a reset port 109, and a power port 108. Of course, other configuration are possible, in addition to the exemplifying one shown in the Figures.

Such tamper-protected computer modules 80 are designed to allow the secure and private execution of software by remote users. A user can remotely and securely verify that (i) each used module 80 has not been physically or logically tampered with, and that (ii) software currently executing on the module 80 in question is indeed what has been previously provided by the user. Further, after use, the modules 80 can guarantee that all information of any previous user has been zeroized and that the module 80 has been restored to a secure state, the "initial secure state" (or "S0"), as described in closer detail in WO 2016/099644 A1. Thus, a user does not have to worry about information leaking to the next user, and a next user can use the module 80 safely, without worrying about compromise from the previous user.

Furthermore, the module 80 also offers access to specialized cryptographic services, provided by the crypto module 140. The IPM 128 is arranged to communicate with the crypto module 140 to access cryptographic and management services provided by the crypto module 140, such as status updates etc. Such services are further detailed in the above referenced international patent publications.

Specifically, in one embodiment, the tamper-protected module 80 makes use of a universal, general-purpose anti-tamper enclosure design comprising one or more enclosing layers 162. An enclosing layer 162 may provide a physical encasing, such as a strong protective shell, that surrounds other portions of the module 80. An enclosing layer 162 may enclose a layer of encapsulating material 146. Various module 80 components or circuitry may be embedded within or built into the encapsulating material 146. In one embodiment, each enclosing layer 162 encloses a corresponding layer of encapsulating material 146.

In one embodiment, the enclosing layer 162 is a specially designed enclosure formed from machined aluminium AL 6061. The encapsulating material 146 may comprise a special resin potting or epoxy, such as the S7527 or S7302 special resins or the Kryptos 17 potting.

In one embodiment, the module 80 may comprise a plurality of enclosing layers 162 that may be nested, one within another, effectively constituting an "onion" of enclosing layers 162. The module 80 may further comprise an encapsulating material 146 between any two such enclosing layers 162. Different enclosing layers 162 may be formed from different materials or combinations of materials, which may be hard or soft. Different instances of encapsulating material 146, such as those enclosed by different enclosing layers 162, may likewise be comprised of different materials or combinations of materials.

In one embodiment, individual enclosing layers 162 and layers of encapsulating material 146 may each be fitted with different tamper-detecting, tamper-respondent, or other anti-tamper capabilities, including different types of tamper-detecting sensors 120 and different types of zeroization support logic 316. For example, a first enclosing layer 162 may provide a physical-penetration detection capability using an electro-capacitive or impedance-altering conductive foil sensor, whereas a second enclosing layer 162 may comprise a mesh of temperature sensors embedded in thermally conductive adhesive. Likewise, a first layer of encapsulating material 146 may comprise different anti-tamper properties than a second layer of encapsulating material 146. Furthermore, an enclosing layer 162 may comprise the same or different anti-tamper properties compared to a layer of encapsulating material 146.

Figure 2:
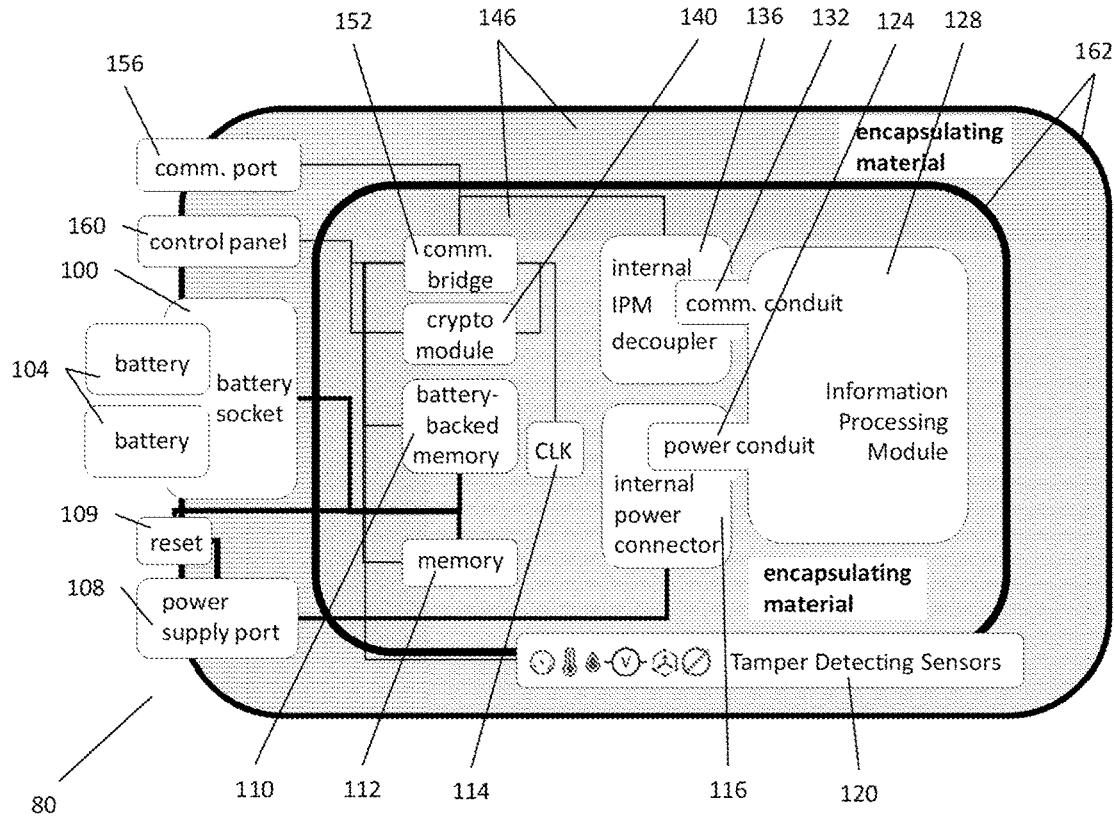
Figure 3:
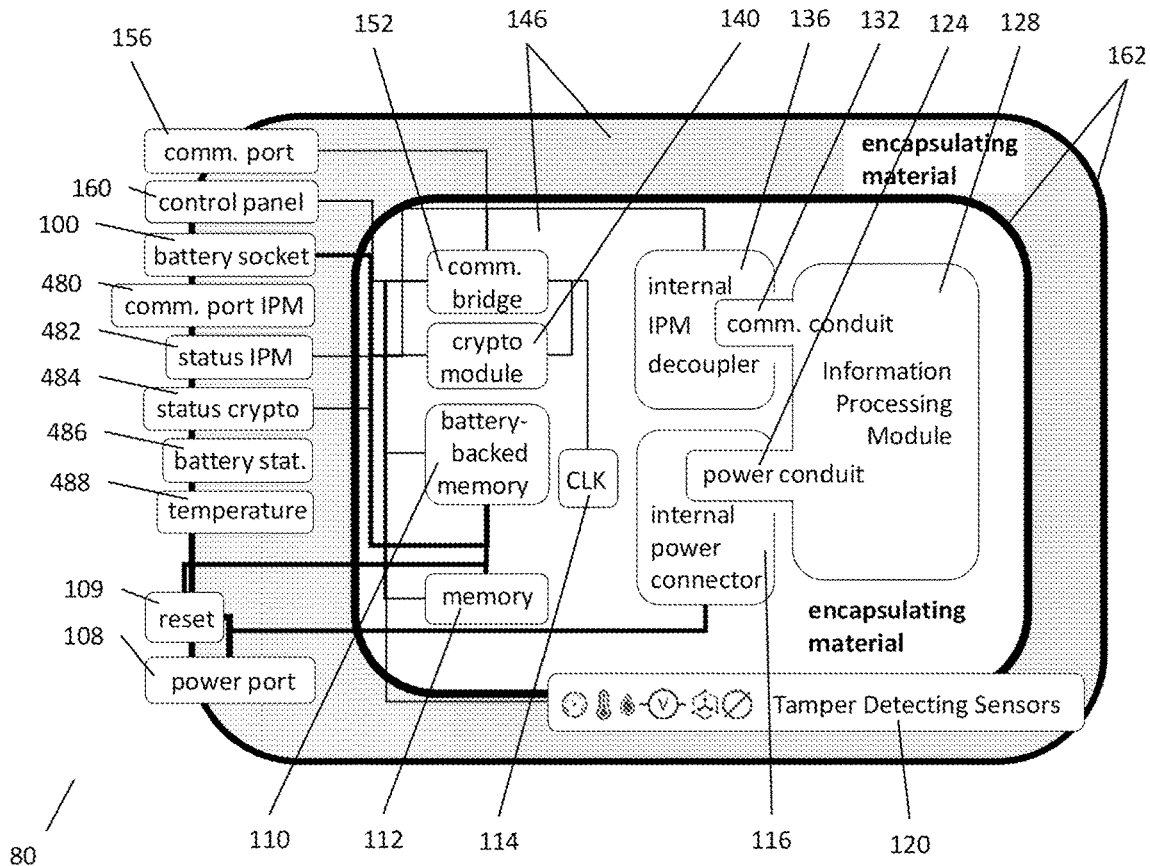

As depicted in FIGS. 1-3, an exemplifying embodiment of the tamper-protected module 80 may comprise at least one tamper-detecting sensor 120. A tamper-detecting sensor 120 includes any sensor deployed in the context of securing an anti-tamper design. For example, the tamper-detecting sensor 120 may include a sensor configured to detect, relative to a predefined range, changes in temperature, mechanical pressure, atmospheric pressure, radiation, voltage, UV, impedance, electrical current, or any other system or environment property. The tamper-detecting sensor 120 may also comprise an intrusion detection circuit. Any number of tamper-detecting sensors 120, of the same or differing types, may be embedded in any given enclosing layer 162 or encapsulating material 146.

In one embodiment, the tamper-detecting sensor is composed of a single or multi-layer FlexPCB or a silver-ink dielectric combination printed circuitry bound to one or more enclosing layers using heat-cured epoxy such as the 3M AF 163-2 or the Henkel EA 9696 adhesive films. Other embodiments of the tamper-detecting sensor may include: a light sensor, such as the Rohm Semiconductor BH1603FVC-TR; a temperature sensor, such as the Microchip Technology MCP9701T-E/LT; a microphone sensor, such as the CUI Inc CMA-4544PF-W; and a vibration sensor, such as the TE Connectivity 1-1002608-0. Multiple sensors may be connected using a multiplexer, such as the Vishay DG4051AEQ-TI-E3.

Any tamper-detecting sensor 120 may include an output port (pin), an input port (pin), or both, connecting to one or more other components of the tamper-protected module 80 to form a closed circuit. By means of such connections, a tamper-detecting sensor 120 may be configured to monitor one or more connections and detect an intrusion by detecting a disconnected or shorted circuit; a change in temperature, voltage, or resistance outside the predefined range; or any combination thereof. In one embodiment, at least one tamperdetecting sensor 120 may connect directly to the cryptography module 140 or to other circuitry of the module 80.

In one embodiment, the module 80 may include at least one memory module 112 configured to store information. Memory module 112 may be any circuitry configured to contain information, such as SRAM, DRAM, FLASH, ROM, PROM, EPROM memory chips, communication buffers, communication conduits, and so on. A memory module 112 may be internal to a cryptography module 140 as shown in FIG. 1, or external to the cryptography module as shown in FIG. 2.

At least one memory module 112 may be a battery-backed memory module 110. The module 80 may include any number of memory modules 112 and battery-backed memory modules 110, including none at all. For the purposes of this disclosure, a battery-backed memory module 110 is a type of memory module 112 that is configured to be connected to a battery. Some or all of memory module 112 and battery-backed memory module 110 may be connected to a general circuitry main power supply of the tamper-protected computer module 80. The battery-backed memory module 110 may be configured to preserve any data stored in it, even after main power is removed. A battery-backed memory module 110 may be used for storing information that needs to be preserved across transitions between multiple customers, parties, vendors, and the like, or during periods when the module 80 does not have access to its main power supplies. A battery-backed memory module 110 may be internal to the cryptography module 140 as shown in FIG. 1, or external to the cryptography module as shown in FIG. 2.

Figure 4:
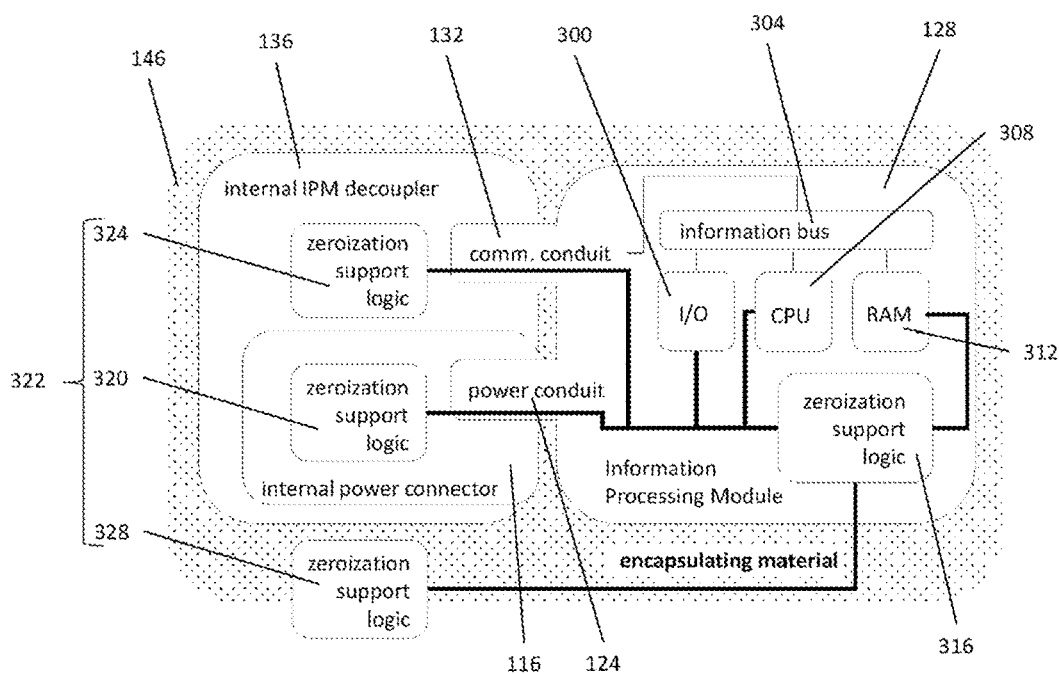

Any memory module 112 or battery-backed memory module 110 may be a zeroizable memory module (see FIG. 4). A zeroizable memory module is a type of memory module 112 or battery-backed memory module 110 that contains or is tightly integrated with zeroization support logic 316. Such zeroization support logic (ZSL) 316 may be any means, including materials, hardware, software, firmware, or any combination thereof, configured to aid in the process of zeroization of such memory.

For the purposes of this disclosure, zeroization refers to a process of obliterating, destroying, or otherwise impairing information contained within any component or circuitry of system 80, including memory chips, communication buffers, communication conduits, or any other element of the invention. Zeroization may include physically destructive means, physically non-destructive means, or both. For example, zeroization of a zeroizable memory module may be accomplished in a physically destructive manner by causing a high-voltage current to travel through the memory cells. Further, zeroization of a zeroizable memory module may be accomplished in a physical non-manner, such as by disabling the self-refresh mechanism of DRAM, setting all bits to a known value.

For both physically destructive and non-destructive zeroization, ZSL 316 may be necessary (see FIG. 4). ZSL 316 may be internal or external to any component of system 80. As alluded to above, ZSL 316 may include DRAM refresh firmware configured to disable its self-refresh mechanism. As another example, ZSL 316 may include an electrical conduit configured to feed high-voltage current to a zeroizable memory module or other component. Further examples include a combustibly destructive microelectronic circuit board interconnection, or a sheet of pyrofuse foil as disclosed in U.S. Pat. No. 4,860,351 A.

The tamper-protected module 80 may also comprise the clock ("CLK") 114. The clock 114 may comprise hardware, software, firmware, or some combination thereof, that implements a notion of global event ordering or time—a measure by which events may be ordered from the past through the present into the future, and may also measure the durations of events and the intervals between them. A clock 114 may be as simple as a continuously incrementing counter, or as complicated as a full-fledged real time clock and calendar.

For example, in one embodiment, the clock 114 may be used in time-stamping communication between internal components of the module 80, or between an externally arranged party and module 80 internal components. The clock 114 may be internal to the cryptography module 140 as shown in FIG. 1, or external to the cryptography module 140 as shown in FIG. 2. In one embodiment, the clock 114 may be connected directly to the cryptography module 140 or to other internal circuitry of the module 80.

The cryptography module 140 may be included in one embodiment of the invention. The cryptography module (crypto module) 140 may comprise hardware, software, firmware, or some combination thereof, configured to implement cryptographic logic or cryptographic processes, including cryptographic algorithms and functions, such as asymmetric and symmetric key encryption, cryptographic hash functions, the generation of random numbers, and other cryptographic logic or processes known in the art. Crypto module 140 may include additional features, such as internal FLASH memory, a tamper-respondent design, battery-backed memory, and a real-time clock. Examples of crypto modules include the MAXQ1850 DeepCover Secure Microcontroller with Rapid Zeroization Technology and Cryptography, and the MAX32550 DeepCover Secure Cortex-M3 Flash Microcontroller.

FIG. 1 depicts an embodiment of the module 80 in which a memory module 112, a battery-backed memory module 110, and a clock 114 are arranged internally to the crypto module 140. To the contrary, FIG. 2 illustrates an embodiment of the module 80 in which the memory module 112, battery-backed memory module 110, and clock 114 are arranged externally to the crypto module 140.

The tamper-protected computer module 80 may be adapted to receive, accommodate and completely enclose the information processing module 128, and to utilize the information processing functionality provided by such information processing module 128. FIGS. 1, 2, and 3 illustrate embodiments of the tamper-protected computer module 80 with a respective information processing module 128 connected. For purposes of this disclosure, an IPM 128 is a module that may receive inputs, such as those of a digital or analog nature; compute a digital, mathematical, mechanical, or signal processing function; and produce outputs, such as those of a digital or analog nature. An IPM 128 may contain circuitry configured to provide a desired information processing functionality of the module 80. Conceptually, the IPM 128 may represent a modular instance of a subset of the CPC of a module 80. As depicted in FIG. 4, the IPM 128 may comprise an information bus 304, input-output circuitry 300, a central processing unit 308, a memory module 312, and zeroization support logic 316. As used in this disclosure, the "connection status" of an electrical component, such as the IPM 128, refers to whether the component is electrically connected or not connected to the tamper-protected computer module 80. For example, an electronic component electrically connected to the system has a "connected" connection status, while alternatively, when the component is not electrically connected to the system, the component has a "not connected" connection status.

In one embodiment, the IPM 128 is, preferably releasably, connected to a physical connector of the tamper-protected module 80. Hence, the module 80 is then configured to receive at least one, preferably several, IPM's 128, which IPM'2 128 are then considered an independent component capable of utilization by the module 80.

Various types of information processing modules are known in the art. An IPM 128 (see FIG. 4) may comprise one or more central processing units (CPUs) 308, memory, input/output circuitry 300, communication conduits, RAM 312, or a number of additional support circuitry. Examples of such IPMs 128 include computers, laptops, credit-card-sized "mini" computers such as the Raspberry Pi, Arduino, Banana Pi, and BeagleBone, and digital signal processing modules. The CPU 308 may be of a standard off-the-shelf architecture, such as x86 produced by Intel and AMD; ARM produced by HP, Samsung, and Qualcomm; or PowerPC produced by IBM, Microsoft, Sony, Toshiba, and Freescale. Alternatively, the CPU 308 may be of a custom design.

The IPM 128 may be built from mass-produced components familiar in the smartphone and general mobile/ARM markets, such as an ARM Cortex-derived smartphone system on chip (SoC), the Raspberry Pi, Arduino, Banana Pi, and BeagleBone, and the Samsung Exynos ARM SoC, or it may be a mass-produced computer or server motherboards, or circuitry of a custom design. One or more of any IPM 128 used in module 80 may include guidance circuitry, such as avionics guidance circuitry, naval guidance circuitry, satellite guidance circuitry, missile guidance circuitry. Additionally or alternatively, any IPM 128 may include non-guidance circuitry, including digital signal processing (DSP) circuitry, such as the off-the-shelf Texas Instruments Ultra-lower Power DSP system on chip.

Again referring to FIGS. 1-4, one embodiment of the tamper-protected computer module 80 comprises an internal IPM decoupler 136 configured to connect with, such that the module 80 may utilize the functionality of, at least one electronic component, and physically decouple such electronic component from the module 80, and logically decouple such component from the R&D or certification of the system 80. Examples of such electronic component include the IPM 128 and the cryptography module 140. For instance, in one embodiment, the internal IPM decoupler 136 is configured to provide a modular design of tamper-protected module 80 such that a different or higher-performing IPM 128 may be utilized by the module 80, even as the system's design is updated, and without requiring recertification or additional system redesign. This is described in detail in WO 2016/137573 A1, referenced above.

Further, the modular system design provided by the internal IPM decoupler 136 may also provide the tamper-protected 80 compatibility with a plurality of IPM 128 designs. For example the module 80 design may utilize a general-purpose programmable computation IPM 128, such as a general-purpose computer motherboard in turn comprising said components 300, 304, 308, 312.

Elements of the tamper-protected 80 may undergo thorough testing and certification independent of the selection of the type of IPM 128 that the module 80 will ultimately utilize. This enables the information processing functionality of the module 80 to be selected subsequently. The selected information processing functionality may then be provided by simply connecting a corresponding IPM 128 with the internal IPM decoupler 136, thus installing the IPM 128 in the module 80. Such installation of a desired IPM 128 may occur prior to the module 80 being physically sealed and delivered to a customer.

In one embodiment, the internal IPM decoupler 136 may comprise a port of a known type, such as DVI, HDMI, USB, or Ethernet port. Or, a custom-designed internal IPM decoupler 136 may be utilized, such as one with reinforced electrical conduits for a USB connector that enables it to carry higher voltages and higher currents than otherwise possible. In one embodiment, the internal IPM decoupler 136 is configured such that an IPM 128 may easily be "plugged in" at the factory, before the module 80 is physically sealed.

Referring to FIGS. 1-4, the tamper-protected computer module 80 may comprise an internal power connector 116 configured to supply power to the module 80 or an IPM 128. In one embodiment, the internal IPM decoupler 136 and the internal power connector 116 may be structurally linked, situated within each other, or both. FIG. 1 depicts an embodiment in which the internal power connector 116 is situated within the internal IPM decoupler 136. FIGS. 2 and 3 illustrate a respective internal power connector 116 that is structurally separate from the internal IPM decoupler 136.

In cryptography, power analysis is an attack in which the attacker studies the power consumption of a cryptographic hardware device (such as a smart card, tamper-resistant "black box," or integrated circuit) with the goal of extracting cryptographic keys and other secret information from the device.

In one embodiment, the internal power connector 116 and the internal IPM decoupler 136 may comprise defenses against differential power analysis attacks. For example, the power circuitry may be designed so as to ensure a power draw that is unrelated to the internal processing or data contained within. This can be achieved by numerous means, including a simple two-capacitor scheme in which external power charges two capacitors in turn and the internal circuitry only powers up from one of the capacitors that is not currently being charged, thus separating power consumption from power delivery. Further, low-pass electrical filters can be placed on any power-related conduits to prevent egress of any sensitive internal signals.

The tamper-protected computer module 80 may further comprise an external power supply port 108. The power supply port 108 may be of a standard existing type, such as a coaxial power connector, a Molex connector, Tamiya connector, or SAE connector; or of a custom design. In one embodiment, the power supply port 108 may be structurally connected with the external communication port 156. In an alternate embodiment, the power supply port 108 and the external communication port 156 may be structurally separate.

In one embodiment, the module 80 may use the external power supply port 108 or other components to allow wireless or contactless power delivery in which power is provided without a physical connection to an external power source, such as by using electromagnetic radiation or induction principles.

In an embodiment, the tamper-protected module 80 may comprise an external battery connection socket 100 configure to receive one or more batteries 104. Such batteries 104 may be of a standard existing type, such as D, C, AAA, AA, CR2/3A, CR1/2AA, and CR123A, or of a custom design.

In one embodiment, the tamper-protected module 80 is configured such that removing or otherwise disconnecting any or all batteries 104 is perceived by the module as a tampering attempt. In this manner, the module may require connection with at least one battery 104 to provide a power source for the battery-backed memory module 110. Disconnecting all batteries 104 may perturb proper functioning of the system 80.

In one embodiment, the battery connection socket 100 may connect at least two batteries 104, each of which alone is sufficient to provide the necessary amount of power required s1 by the module 80. Having at least two batteries 104 may allow replacing a used battery, which may be swapped with a replacement, while the other battery continues to provide the necessary battery power.

In one embodiment, the battery connection socket 100 and associated circuitry includes charging circuitry for rechargeable batteries so as to ensure optimal battery levels throughout the lifetime of the module 80.

Further, the battery connection socket 100 and associated circuitry may also comprise a capacitor or energy source configured to provide power to the module circuitry during battery 104 replacement. In this case, a single-battery design may be sufficient.

The module 80 may comprise a digital communication port 156 configured to provide an interface between the module 80 and external devices. The communication port 156 may be externally accessible, i.e., from outside the module 80. Typical known uses of communication ports include connecting a computer to a monitor, webcam, speakers, or other peripheral device. On the physical layer, a communication port may be a specialized outlet configured to receive a plug or cable. Electronically, conductors where port and cable contacts connect may provide means to transfer signals between devices. The communication port 156 may be of a standard existing type, such as PCIe, serial, parallel, DVI, HDMI, USB, Ethernet, DIMM, and SOD IMM, or of a custom design.

The communication bridge 152 may comprise hardware, software, firmware, or some combination thereof, configured to interconnect a plurality of digital or analog devices. A simplistic example of a communication bridge is a simple electrical conduit, while more complex designs include traditional bus or hub architectures. The communication bridge 152 provides means for components of the module 80 to communicate with each other or with an external device. In one embodiment, the communication bridge 152 interconnects any or all of the following: the sensors 120, the internal IPM decoupler 136, the crypto module 140, the memory module 112, the battery-backed memory module 110, and the externally-accessible communication port 156.

In one embodiment, the IPM 128 may comprise a power conduit 124, which may be configured to connect to the internal power connector 116. The power conduit 124 and the internal power connector 116 may be structurally linked, as depicted in FIGS. 1, 2, and 3; situated one within the other; or both. In one embodiment, the power conduit 124 serves as a means for the IPM 128 to draw power from the internal power connector 116 and distribute the power to the IPM 128 components.

In an embodiment, the IPM 128 may comprise a communication conduit 132, which may be configured to connect to the Internal IPM decoupler 136. In one embodiment, the communication conduit 132 serves as a means for the IPM 128 to communicate with other components of the module 80, such as the communication bridge 152 and the crypto module 140, by connecting through the internal IPM decoupler 136.

In one embodiment, internal circuitry, including the internal IPM decoupler 136, the IPM 128, the communication bridge 152, the crypto module 140, memory module 112, battery-backed memory module 110, and the clock 114, may be contained within at least one enclosing layer 162 or encapsulating material 146.

The zeroization support logic (ZSL) 316 may connect with ZSL external to the IPM 128, such as ZSL 320 part of the internal power connector 116, or ZSL 324 part of the internal IPM decoupler 136. Moreover, any component of the tamper-protected module 80 may be fitted with some form of ZSL. The ZSL in any component may cooperate with the ZSL in any component or components.

In one embodiment, zeroization support logic such as the ZSL 316 part of the IPM 128, ZSL 320 part of the internal power connector 116, ZSL 324 part of the internal IPM decoupler 136, or ZSL 328 residing in an enclosing layer 162 or encapsulating material 146 may include an electric charge capacitor, a reinforced electrical conduit configured for transportation of high-voltage current to a zeroizable memory module to be zeroized, a combustibly destructive microelectronic circuit board interconnection, a sheet of pyrofuse foil that may be electrically activated, or other forms of ZSL known in the art.

In an embodiment as depicted in FIG. 4, separate ZSL 328 may reside in any enclosing layer 162 or encapsulating material 146 of the module 80. The ZSL residing in a layer 328 may be configured to connect with the communication bridge 152 or other system components.

The crypto module 140 may aid in zeroization of any component of the module 80. For example, in one embodiment, the tamper-detecting sensors 120 are connected to the crypto module 140. When the crypto module 140 becomes aware of a tamper event through communication with the tamper-detecting sensors 120, the crypto module instructs the zeroizable memory module 112 to zeroize. The crypto module 140 may also connect to the internal IPM decoupler 136, the internal power connector 116, the ZSL within the internal IPM decoupler 324, the ZSL within the internal power connector 320, the ZSL 328 within an enclosing layer 162 or encapsulating material 146, or any combination thereof, and request zeroization.

In one embodiment, the crypto module 140 may be further configured to control the electrical signals pertaining to the internal IPM decoupler 136, the internal power connector 116, the communication bridge 152 and other internal components. For example the crypto module 140 may be configured to turn on or off the IPM 128 either based on a certain predefined condition, such as an electrical assumption being violated, or dynamically as directed by specialized firmware running inside the crypto module 140. Further, the crypto module 140 may be configured to judiciously alter the data signals the IPM 128 receives through the communication bridge 152 or the internal IPM decoupler 136, for example by adding or removing certain packet header information or suppressing certain data fields.

In one embodiment, when a tampering event is detected by a tamper-detecting sensor 120, the ZSLs 322 external to the IPM 128 cooperate with the ZSL 316 internal to the IPM 128 to zeroize the information stored in a IPM memory module 312. The zeroization method employed may be novel or existing, such as disclosed in U.S. Pat. No. 4,860,351 A, in which electrical current is distributed through a coil or coils, or in U.S. Pat. No. 3,882,324 A which describes a method and apparatus for combustibly destroying microelectronic circuit board interconnections. Ignition of the self-destruct interconnections may be achieved by enclosing the circuit board in a box which also mounts a sheet of pyrofuse foil. Enclosed metallized connections may be directly exposed to the foil so that, when the foil is ignited, the high heat of its thermite reaction ignites the self-destruct film interconnections. The violent reaction of the foil may also produce a sputtering of high temperature metal particles that strike the metallized interconnections at various points to positively assure ignition and the desired destruction of these interconnections.

In one embodiment, materials such as Indium NanoFoil® may be repurposed to act as the energy source for the destructive zeroization.

In one embodiment, the tamper-protected module 80 may comprise at least one reset module 109 configured to restore the module to an initial pre-used state.

For purposes of this disclosure, the term "state" comprises the totality of the information stored in the module's 80 components, including, but not limited to, its firmware, loaded code, memory, CPU data, caches, and overall internal hardware configuration. "State" further comprises any additional information that helps to completely describe the module 80 at a particular time, including information related to its network state, firewall rules, uptime, usage, and identity of parties that have accessed the module 80 in the past in any capacity.

The reset module 109 may include a power reset pin configured to perform a complete power-cycle of the module 80. The power reset pin may be accessed physically, electrically, or by other means. The power reset pin may be a switch configured to be turned on and off In one embodiment, the power reset pin may be configured for use by external parties to power-cycle the enclosure. This may result in the module 80 resetting to a secure initial state—as may be defined in a security policy describing the system, e.g., such as required by NIST FIPS certification—with all information related to use of the tamper-protected module 80 prior to the power-cycle being zeroized.

In one embodiment, use of the reset module 109 or power-cycling does not zeroize all internal information. For example, vendor-related certificates or other cryptographic materials and keys unrelated to the module 80 use just prior to the power-cycle may be preserved.

In one embodiment, the module 80 provides separate means to reset a certain state within the cryptographic module 140 only and not zeroize all internal information. For example, vendor-related certificates or other cryptographic materials and keys unrelated to the module 80 use just prior to the power-cycle may be preserved.

There are also various additional means of resetting the module 80, all of which are contemplated by the present invention. Multiple different types of reset modules 109 may be provided, each type resulting in a different system state after reset. For example, in addition to a power cycle reset, a certain "software reset" type may be provided in which, e.g., software loaded onto the IPM 128 may be restarted without any additional information being zeroized.

In one embodiment, the power delivery circuitry comprised by the internal power connector 116 or internal IPM decoupler 136 may interact with the crypto module 140 so as to ensure that a reset of the crypto module is not possible without a complete power cycling of the IPM 128 for a minimum amount of time. A possible design comprises a time-delay relay circuit controlled by the crypto module 140 or a drop in its input voltage—once powered off, the time-delay relay ensures that a given amount of time passes before power to the IPM 128 is restored.

This defends against attacks aiming to reset the crypto module 140 without also power-cycling the IPM 128, which is often undesirable when the crypto module 140 is used to keep track of the state of the IPM 128. By ensuring a time delay before turning power back on, the system guarantees a full reset of the IPM 128 internal state back to an initial state.

In one embodiment, the tamper-protected module 80 may comprise a control panel 160 configured to provide a communication link for components internal to the module to communicate with external parties, including communications from external parties to components internal to the system.

In one embodiment, any of the following components may be situated within, or structurally linked to, any other such component, or both: the control panel 160, the communication port 156, the reset module 109, the power connector 108, and the battery connection socket 100.

In one embodiment, the crypto module 140 may use the communication bridge 152 to communicate with third parties through the external communication port 156 or control panel 160, in the process of enforcing security assurances of the tamper-protected computer module 80. For example, the crypto module 140 may engage in a verification protocol with a third party in an attempt to prove that the module 80 has been manufactured by a trusted vendor and that no tampering has been detected yet. To this end, the crypto module 140 may also communicate with the IPM 128 using the communication bridge 152, the communication conduit 132, and the internal IPM decoupler 136.

In an alternate embodiment, the IPM 128 may engage in said verification protocol and communicate with third parties 416 using the communication bridge 152, the communication conduit 132, and the internal IPM decoupler 136. The IPM 128 may also request the aid of the crypto module 140 through the communication bridge 152, the communication conduit 132, and the internal IPM decoupler 136.

One of the important services offered by the security anchor 140 is a witnessing service. Remote users may also want to ensure that a tamper-protected computer module 80 of the type discussed herein is in a secure state that matches users' expectations (e.g., the correct firmware, operating system, applications, and networking state). This is especially important in systems such as clouds 650 that allow such modules 80 to be (re)used over time by multiple mutually-mistrusting users, which could even be potentially commercially competing enterprises.

In one embodiment, ensuring that the module 80 is in a secure state is achieved by deploying remote attestation mechanisms that keep track securely of important state changes associated to the module 80 by "witnessing" information describing these state changes as precisely as needed. As such, it is contemplated that state change events may be described by a value and the process of witnessing events may be defined as the process of witnessing that value. It is contemplated, however, that for such a witnessing to be effective for its purpose, information already witnessed may not be repudiated. For example, the string "loading operating system v3.30" concatenated with a cryptographic hash of the loaded operating system code, e.g., "de9f2c7fd25e1b3afad3e85a0bd17d9b100db4b3," may constitute precise-enough information to describe the operating system loading event and the associated state change.

In addition, witnessing may track information about state change events, such as downloading, loading, running, and generating network identities. It is recognized, however, that in some embodiments, witnessing of any information, even unrelated to state changes, may also be implemented.

In one embodiment, witnessing of information may entail executing a special function, witness( ), that may take as a parameter the information to be witnessed; for example, witness ("loading kernel v1.1 with SHA digest 2fd4e1c67a2d28fced849ee1bb76e7391b93eb12"). In some embodiments, witnessing may require maintaining of one or more "witness registers" (or WR), values that may comprise a digest of the already witnessed information items.

Accordingly, a WR is said to have been "witness to" said information items. As such, for the attestation system to be effective, certain levels of protection for the WR registers must be provided. In some embodiments, the WR registers may be unforgettable, indelible, and/or may not be changed arbitrarily or in an unauthorized manner, but may be used only to witness information. Moreover, some embodiments enable a party external to the module 80 in question to be able to validate whether a given WR corresponds to an ordered list of information items.

It is contemplated that witnessing may be performed with support from the crypto module 140, which may be programmed with special code for this purpose, and the WR registers may be maintained by the crypto module 140 and/or may be internal to the crypto module 140. As the witness(x) function may be implemented by the crypto module 140, it is contemplated that calling the function witness(x) function may change a WR as follows:

$$WR=h(WR|x|WR),$$

where $h(\ )$ is a cryptographic hash function and "|" denotes concatenation. It is understood that many other combinations of cryptography and hash functions are possible in the construction of the witness function, including the following:

$$WR=h(WR|h(x)|WR)$$

$$WR=h(WR|h(x|WR))$$

$$WR=h(WR \oplus h(x) \oplus WR).$$

State changes at varying degrees of granularity may be witnessed. One example may be witnessing the transitions from a bootloader to a kernel of the IPM 128, from the kernel to an operating system, and from the operating system to an application executed within said operating system. Another example may be witnessing individual events of loading and unloading applications within the operating system.

Herein, witnessing is also denoted "measuring".

In general, at least one, preferably each, of said tamper-protected computer modules 80 connected to said computer server device 690 may comprise a respective witnessing service, arranged to witness state changes in the tamper-protected computer module 80 in question, and arranged to provide a digital communication interface using which the server control unit 600 can request witnessing information from the witnessing service. It is understood that such witnessing functionality may be provided by the crypto module 140.

As a security concern, it is contemplated that, in a typical embodiment, the tamper-protected computer module 80 in question is operated to ensure any internal state, register (including the WR registers), memory, or other component that may have been impacted by a previous user's code or data presence, and in particular any installed IPM 128, gets reset and zeroized at every power cycle. This may ensure a fully fresh start in a known secure state for any next user. A correctly functioning module 80 just after electrical power-on, before executing any code, is said to be in an "initial secure state" (or "S0").

In some implementations, witnessing would commence from the moment the tamper-protected computer module 80 is in state S0, while in others, witnessing may start from a later point when the module 80 is in a different state, such as the moment after the bootloader may already have been loaded.

Through the witnessing routine, the module 80 generates an ordered set of information items witnessed since the last power-up, called the "witnessed set". In one embodiment, an external (to the module 80) verifier may be able to validate whether a given witnessed set corresponds to a given register WR0. To this end, the verifier in question may perform a separate witnessing operation for each element in the witnessed set into a different witness register (or RR) and then check whether the resulting value of RR equals WR0. The witnessing mechanisms may also allow such a verifier, in particular a remote user or another party, to validate a list of claimed state changes-starting from an agreed-upon secure state (e.g., S0)—against the current WR0 value. A match may provide the verifier in question an accurate picture and assurances about the current state of the module 80; for example, the already-loaded logical layers and the currently executing software.

Multiple values may be witnessed in different witness registers. For example, WR0 may be s1 used for witnessing BIOS, kernel and operating system loading whereas WR1 may be used for witnessing a specific application's actions etc.

For a more detailed discussion regarding witnessing issues, reference is made to WO 2016/137573 A1 and WO 2016/099644 A1.

One of the advantages of the modular design of the tamper-protected computer module 80 is the fact that new updated off-the-shelf IPMs 128 can be integrated in the same design, without having to subject the design to security re-certification.

For example, the IPM 128 can be any of the latest off-the-shelf server-grade motherboard with ECC DRAM and powerful Intel processors. New modules 80 can be manufactured with the latest such IPMs 128, without having to change the rest of the components or re-certifying the design.

This reduces cost and increases time to market, and new powerful revisions of the module 80 can be released, for instance, monthly. In contrast, old-style existing monolithic HSM designs feature 4-6 year design, production, testing, and certification cycles.

The present invention solves, inter alia, the problem of allowing users remote access, in a conventional computer network context, to tamper-protected computer modules, and in particular in a way allowing users to seamlessly request and be allocated secure computing power resources, which secure computing power resources are based upon the loading and execution of computer software code into and on such tamper-protected computer modules.

The used tamper-protected computer modules in question, and their use in the present invention, will be described in further detail in the following. The computer-protected computer modules may be of any suitable type, but it is preferred that they are of the general type 80 described above. Hence, all which has been said above is typically also applicable to what is described in the following.

Figure 5:
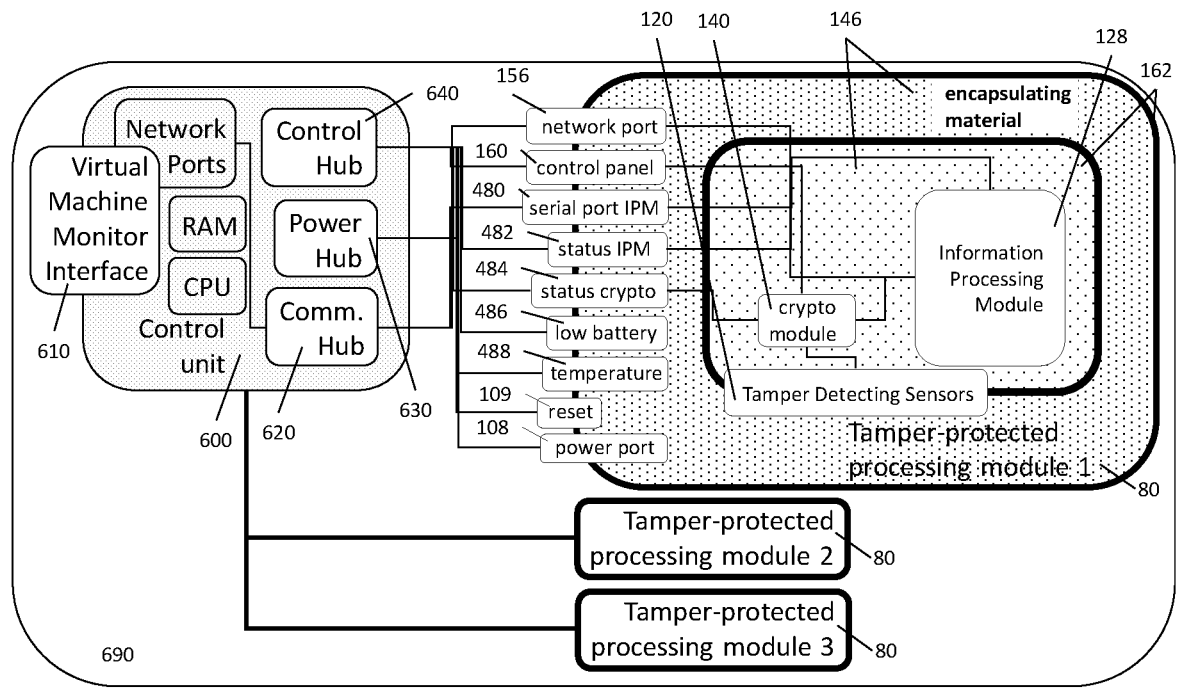
FIGS. 5 and 6 are respective schematic views of two different computer server devices according to the invention.

Hence, FIG. 5 discloses a computer server device 690 according to the present invention. The server device 690 comprising a server control unit 600 and at least one, preferably at least two, physical connectors 160, 480, 482, 484, 486, 488, 108, 109 (see below for details) or slots 605 (see FIG. 6) for respective physical tamper-protected computer modules 80. It is noted that the computer server device 690 may or may not have one or several modules 80 connected to said physical connectors at any given time, and that such modules 80 may each be releasably connectable to the physical connectors 605 in question. Each slot 605 may be of standard type, meaning that any one of a selection of compatible module 80 types can be fitted into any one of said slots 605.

Hence, the server device 690 may comprise one or several tamper-protected computer modules 80, connected to one respective connector or slot 605 each. Alternatively, the server device 690 may merely comprise said connectors or slots 605, for connection to tamper-protected modules 80 of the general type described herein. In both cases, the respective connection to tamper-protected modules 80 is a releasable connection, and the server device 690 is specifically adapted for providing such releasable connection. Such specific adaptation covers both a physical shape suitable for connecting to and accommodating the module 80 in question, as well as the herein described functionality for communicating with and handling connected modules 80 in various ways.

According to the invention, at least one such connected tamper-protected computer module 80, preferably each such connected tamper-protected computer module 80, comprises a respective tamper-protected enclosure 162, a respective module 80 control unit and a respective information processing module 128. The respective module 80 control unit of each tamper-protected computer module 80 may comprise any controlling software and/or hardware functionality acting in relation to, and controlling, the IPM 128 in question. For instance, the module 80 control unit may comprise components 110, 112, 114, 116, 132, 136, 140, 146 and/or 152, in any combination. The module 80 control unit may comprise a crypto module 140 of the above-described type.

In particular, the module 80 control unit and the information processing module 128 are both entirely enclosed by said tamper-protected enclosure 162 in question, as described above.

According to the invention, the server control unit 600 is arranged to expose a digital virtualization interface on a network 650 (see FIG. 7) to which the computer server device 690 is connected, providing access to other devices on said network 650 to a respective virtual computer device corresponding to each tamper-protected computer module 80 which is connected to the server control unit 600.

According to one embodiment, there is exactly one module 80 corresponding to each such virtual computer device. According to an alternative embodiment, which will be described in fuller detail below, each module 80 may host one or several virtual computer devices in itself, in which case there may be more than one virtual computer devices for each module 80. Such virtual computer device may also be denoted "virtual machines" or "instances", see the specific discussion on virtualization interfaces below.

Further according to the invention, the server control unit 600 is arranged to receive calls directed to each such virtual computer device, to produce corresponding calls to a corresponding tamper-protected computer module 80 and to, via said digital virtualization interface, deliver such corresponding calls to the corresponding tamper-protected computer module 80 in question. Of course, in order to facilitate communication between the module 80 and its outside world, the server control unit 600 may also be arranged to receive messages from the module 80, to produce corresponding calls to an external party with which the module 80 communicates and to, via the digital virtualization interface, deliver such corresponding calls to such an external party. Hence, the digital virtualization interface is arranged to provide a double-directed communication link between the module 80 and an external party, arranged logically and physically externally to the computer server device 690. This may, of course, also entail numerous other tasks, such as various module 80 allocation tasks performed to provide said virtualization functionality. It is further noted, as will be described below, that it may in general be the hardware of the IPM 128 in question which is used to perform user-requested computations, and that the digital virtualization interface in practise will facilitate double-directed communication between the said external party and the IPM 128, for example via the module 80 control unit, or other networking configurations.

Using such a computer server device 690, a tamper-protected computer module, for instance a modular, cost-effective and securely designed tamper-protected computer module 80 of the above-described type, can be easily integrated into a conventional, standard cloud 650 or data center, comprising a range of servers, without requiring any major changes to existing infrastructure. Such integration will be described in detail below.

In particular, using the present invention it is possible to seamlessly connect multiple tamper-protected computer modules into a physical and logical unit amenable to data center deployment, e.g., as a conventional "rackable" server of standard type.

Furthermore, using the present invention it becomes possible to integrate tamper-protected modules in an existing infrastructure which is built around or uses virtualization methods for allocation of computer resources. Such infrastructure is typically built upon standard off-the-shelf hardware across multiple users, using a virtual machine abstraction. In particular, and as will be detailed below, the present invention allows for seamless userinitiated use and deployment of tamper-protected computer modules of said type in a noncomplicated, straight-forward way which is easily integrated in standard data center workflows.

According to a preferred embodiment, the digital virtualization interface of the computer server device 690 is a hypervisor interface or a virtual machine monitor interface.

It is envisioned that the digital virtualization interface, which is exposed by a corresponding s1 functionality in turn being implemented in software and/or hardware, such as in the form of software running on the control unit 600, may be a standard hypervisor interface. Such a standard hypervisor interface will then support all aspects of such a standard hypervisor interface, in a way so that an external party communicating via the digital virtualization interface sees no difference between the digital virtualization interface and such a standard hypervisor interface, and can use the same functionality for such communication. In particular, the digital virtualization interface may be a standard hypervisor interface identical to one exposed by a conventional software hypervisor.

The computer server device 690 is illustrated in FIG. 5, and comprises hardware and software designed to aggregate one or more tamper-protected computer modules 80 of the above described, or other, types, and to interface them with the outside world in an easy to use manner, as mentioned above.

Specifically, the computer server device 690 comprises the control unit 600 and zero or more, preferably one or more, even more preferably two or more, tamper-protected computer modules 80, placed in and connected to different physical and logical slots 605. The slots 605 are preferably at least two, more preferably at least three, and are each arranged to facilitate the connection of one respective module 80 each to the other components of the computer server device 690, particularly to the said control unit 600, but possibly also to a communication hub 620, a power hub 630 and a control hub 640.

The control unit 600 manages multiple modules 80 through physical and logical control mechanisms, such as the following.

Reset Module 80:
The control unit 600 is arranged to reset modules 80 individually through the control hub 640, for example by electrically controlling the corresponding module 80 reset pin 109 (see above).

Power ON/OFF Modules 80:
Further, the control unit 600 is arranged to turn on or off the power for each module 80 individually, for example through the power hub 630 which is connected to each individual module's 80 power port 108.

Identify Modules 80 and/or Slots 605 Automatically:
Each module 80 may be uniquely identified to parties external to the module 80 (possibly including the control unit 600) by or through an internal identifier ID, for example a UUID constructed from a cryptographic hash of an internally stored public key (PK) in the module 80 in question, as is described in detail in WO 2016/137573 A1.

As modules 80 are installed, added or removed to the computer server device 690, it is important to enable the control unit 600 of the server 690 to easily determine which module 80 is connected to which slot 605. Thus, the control unit 600 is arranged to dynamically and automatically identify which module 80 is connected to which physical slot 605.

Figure 16:
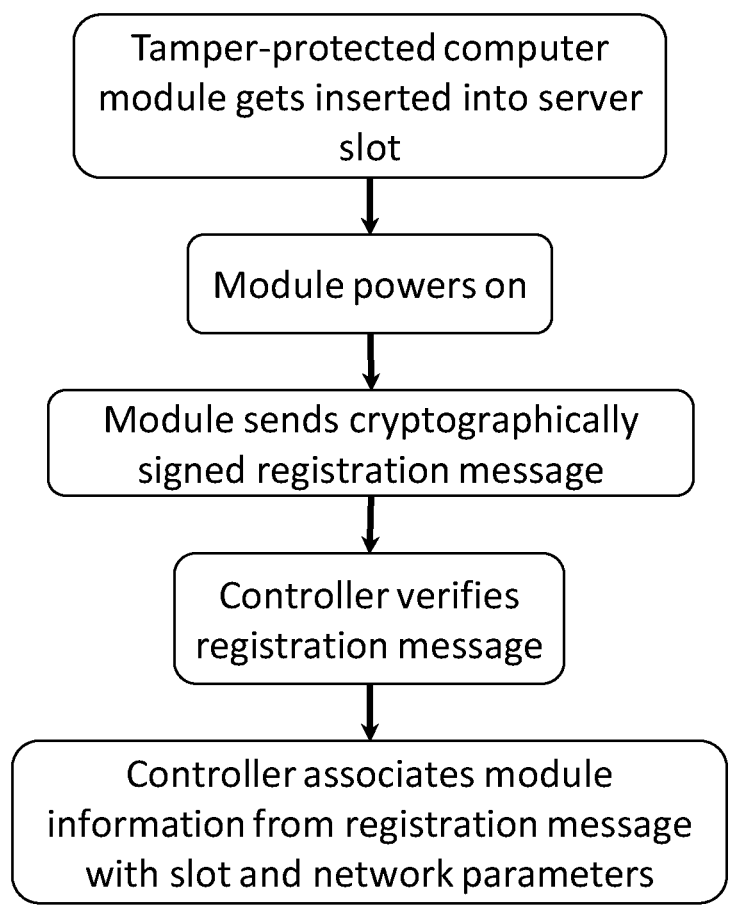

This is achieved by the individual module 80, once added, being arranged to automatically send out a special cryptographically signed registration message broadcast on its network interface 156. Upon receiving the message through the communication hub 620, the control unit 600 is arranged to automatically verify the registration message, and to update its internal view to reflect the association between the module 80 ID and the slot 605 to which the corresponding module 80 is connected, including the association by the control unit 600 of module 80 information from the registration message with slot 605 identity and network parameters information. See FIG. 16.

Networking:
The control unit 600 of the computer server device 690 provides networking connectivity for individual modules 80 through the communication hub 620. Several configurations are considered. For example, the communication hub 620 may be configured to act as a layer-two networking switch to which all modules 80 are connected. Alternatively, the communication hub 620 may be configured as a layer-three network router. Other configurations are also possible.

In any case, for security, the control unit 600 may provide full network isolation between s1 individual modules 80 such that each module 80 can only communicate with the control unit 600, but not see traffic from other modules 80, even if connected to the same communication hub 620 switch. This may be achieved for example by using VLANs or other network isolation mechanisms.

In particular, the server control unit 600 may be arranged to provide a network communication path to each connected tamper-protected computer module 80, and/or to each of said virtual computer devices represented by each such connected tamper-protected computer module 80. Then, the server control unit 600 may be arranged to also provide network communication isolation between individual tamper-protected computer modules 80 and/or such virtual computer devices.

Virtualization Interface:
A standard hypervisor or virtual machine monitor (VMM) is a software that creates and runs virtual machines (VMs). A VM is an emulation of a computer system. Virtual machines are based on computer architectures and provide functionality of a physical computer. Standard full virtualization VMs, for example, provide a substitute for a real machine and the functionality needed to execute entire operating systems. A hypervisor uses native execution to share and manage hardware, allowing for multiple environments which are isolated from one another, yet exist (are executed) on the same CPU. Modern hypervisors use hardware-assisted virtualization, virtualization-specific hardware, pris marily from the host CPUs. The computer on which a hypervisor runs one or more VMs is called a host machine, and each VM is called a guest machine. Multiple instances of a variety of operating systems may share the virtualized hardware resources: for example, Linux, Windows, and macOS instances can all run on a single physical x86 CPU. Examples of hypervisors include QEMU, Xen, Virtualbox, etc.

Existing virtualization-based data centers, server farms, and clouds (the terms "cloud", "server farm", "data center" are used interchangeably throughout this description), use hypervisors running on each individual hardware server to allocate VMs and thus share the same server hardware across multiple users' workloads. This is cost-effective and users can allocate any number of virtual machines that can run on different servers or the same servers simultaneously. Virtualization may be used to share the underlying CPUs across multiple users and thus increase overall utilization of the hardware. In standard cloud contexts, allocated VMs are also known as "compute instances", or "instances".

On the other hand, availing custom security-centric hardware, such modules 80 of the above described type, to cloud users is conventionally achieved in a traditional fashion, using dedicated models in which customers either pre-pay or otherwise reserve actual hardware long-term and then are provided custom mechanisms, interfaces and dedicated software for its management. This leads to significant up-front costs, difficulty of management and use, and reduced utilization, efficiency, an overall reduced return on investment, and lack of scalability, contrary to the entire agile scalability proposition of cloud frameworks.

The present invention facilitates the implementation and use of better mechanisms for integrating secure hardware (such as the computer server device 690 and its modules 80) into cloud architectures 650. These mechanisms need to be secure, scalable, transparent to the users, transparent to the cloud infrastructure 650 in question, backwards-compatible (for easy deployment in existing infrastructures), and allow sharing across multiple cloud users over time, potentially using a pay-as-you-go billing model, without requiring upfront costs. Further, it is desirable that the integration operates using existing interfaces and does not require users to deploy additional software, or change their client-side software. Finally, clouds should not have to change any major existing software or hardware components, and integration should work seamlessly within existing infrastructures and management software.

The present invention makes possible the use of a streamlined and portable way of integrating multiple tamper-protected computer modules into a cloud 650, and in particular into a virtualization-based cloud, without requiring any changes to the basic cloud management framework. Tamper-protected computer modules 80 can be allocated and provided to data center users as "virtual machines", in a fully transparent way. To this end, the control unit 600 may implement a standard virtual machine monitor Interface 610 (also "VMM", or "hypervisor" interface) to interface with the outside world and to allow external parties to allocate, de-allocate, configure and use the computational resources of the computer server device 690.

The computer server device 690 can then connect into an existing cloud infrastructure 650 (see FIG. 7), and, using the virtualization interface exposed by the control unit 600, appear and behave as a standard hypervisor running on an off-the-shelf CPU. For example, in OpenStack, the computer server device 690 can appear as an OpenStack Nova Compute Node.

This way, multiple computer server devices 690 according to the present invention may easily be integrated into the cloud 650 in question, without requiring any changes of the existing cloud 650 infrastructure, neither in terms of hardware or software. From the point of view of a user, and the cloud 650 management functionality, allocating tamper-protected computer module 80 proceeds identically to allocating a standard software-based VM. This significantly reduces the complexity of integrating tamper-protected computer modules 80. It also provides full transparency as well as backwards compatibility with existing cloud 650 infrastructures.

In an exemplifying embodiment, a number of support data structures are used by the computer server device 690, and in particular the control unit 600, to coordinate and manage its internal state. These may include the following tables:

ENFORCERControllers: List of control units 600, of the same other computer server devices 690 according to the present invention, and available on the same cloud 650. Attributes: ID, name, disabled flag.

ENFORCERTypes: List of tamper-protected computer module 80 types. Attributes: ID, name, CPU family, cores, RAM.

ENFORCERInstances: List of guest machine instances allocated on tamper-protected computer modules 80. Attributes: ID, state, allocation mode.

ENFORCERVirtualInterfaces: List of virtual network devices allocated for each ENFORCERInstance. Attributes: ID, instance id (reference to ENFORCERInstances), MAC address.

ENFORCERVolumes: List of disk volumes exported to ENFORCERInstances. Attributes: ID, instance (reference to ENFORCERInstances), auth (credentials used by the control unit 600 to connect to storage server).

ENFORCERs: List of tamper-protected computer modules 80. Attributes: ID, type (reference to ENFORCERTypes), controller (reference to ENFORCERControllers), physical MAC address, slot 605 number, powerType (USB-GPIO, or IPMI, IPMI used for development compute nodes), instance id (reference to ENFORCERInstances), disabled flag.

As has been discussed above, the term "instance", as used herein, in general refers to a guest machine cloud instance which is allocated to, and executed on, a particular tamper-protected computer module 80, and the communication back and forth with the external network is mediated by the said virtualization interface 610.

Configuration State:

In addition to the data management data structures discussed above, the control unit 600 is arranged to digitally store state information for each tamper-protected computer module 80, which state information is made available on demand to the tamper-protected computer module 80 in question at boot-time and throughout an allocation cycle.

For example, each tamper-protected computer module 80 may be allocated a speciallys dedicated digital file storage directory, storing various configuration files corresponding to different software components such as dnsmasq, iscsi, http, and syslog.

Figure 6:
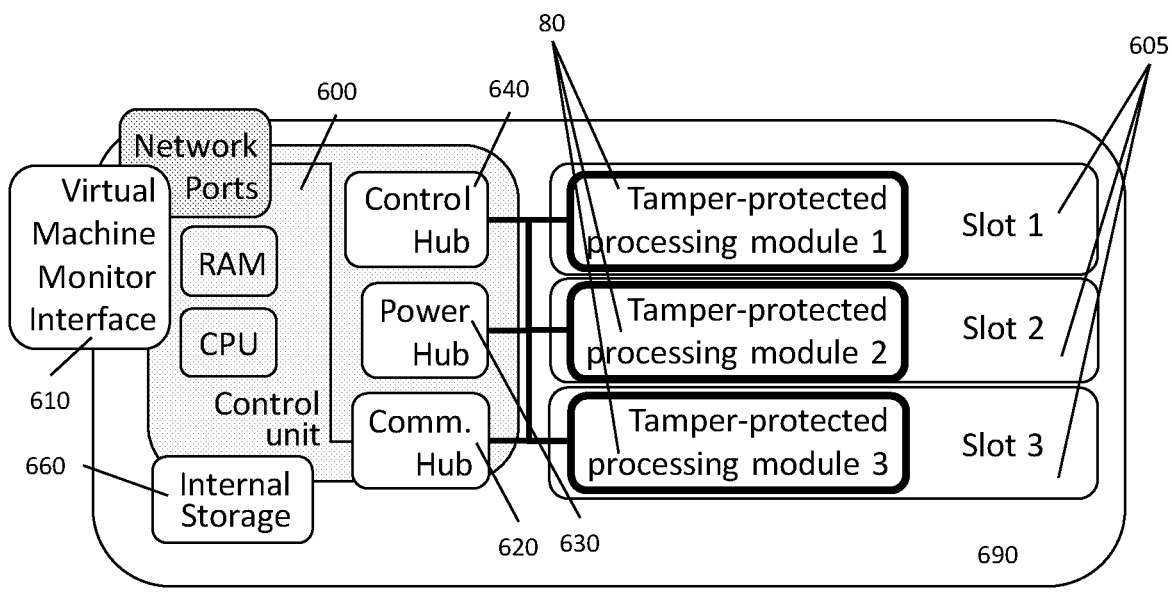
Figure 7:
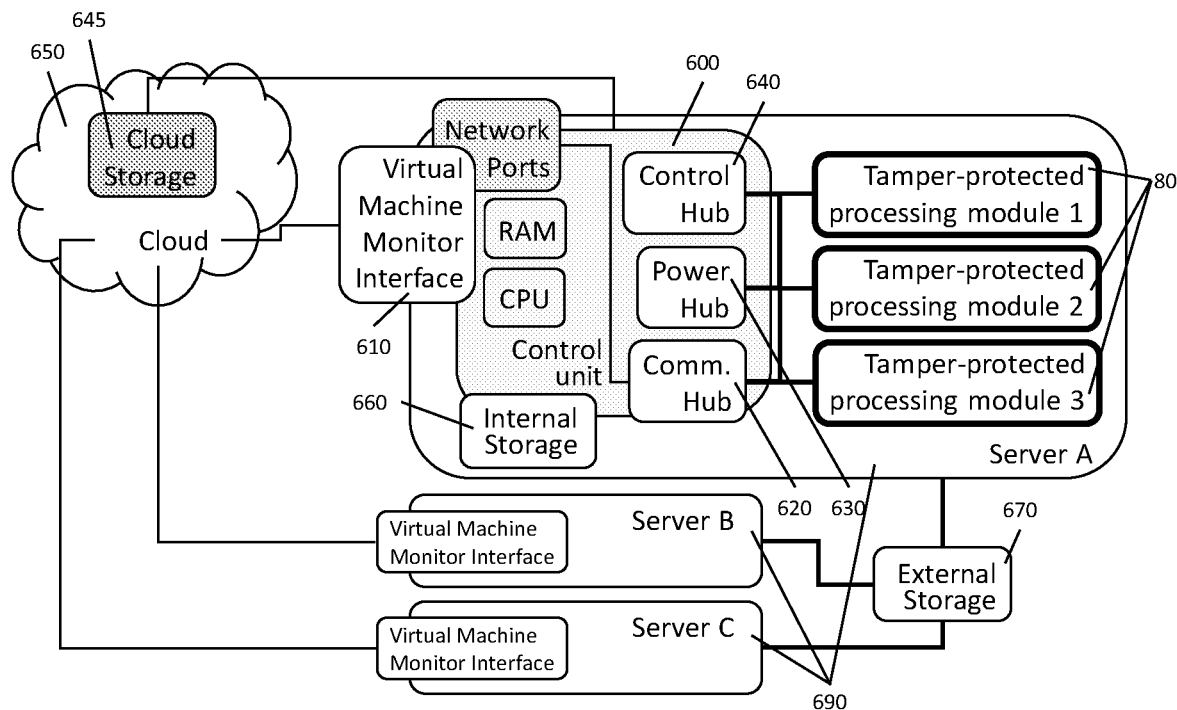
FIGS. 7 and 8 are respective schematic views of two different systems comprising a respective set of several computer server devices according to the invention, integrated in a respective network.
Figure 8:
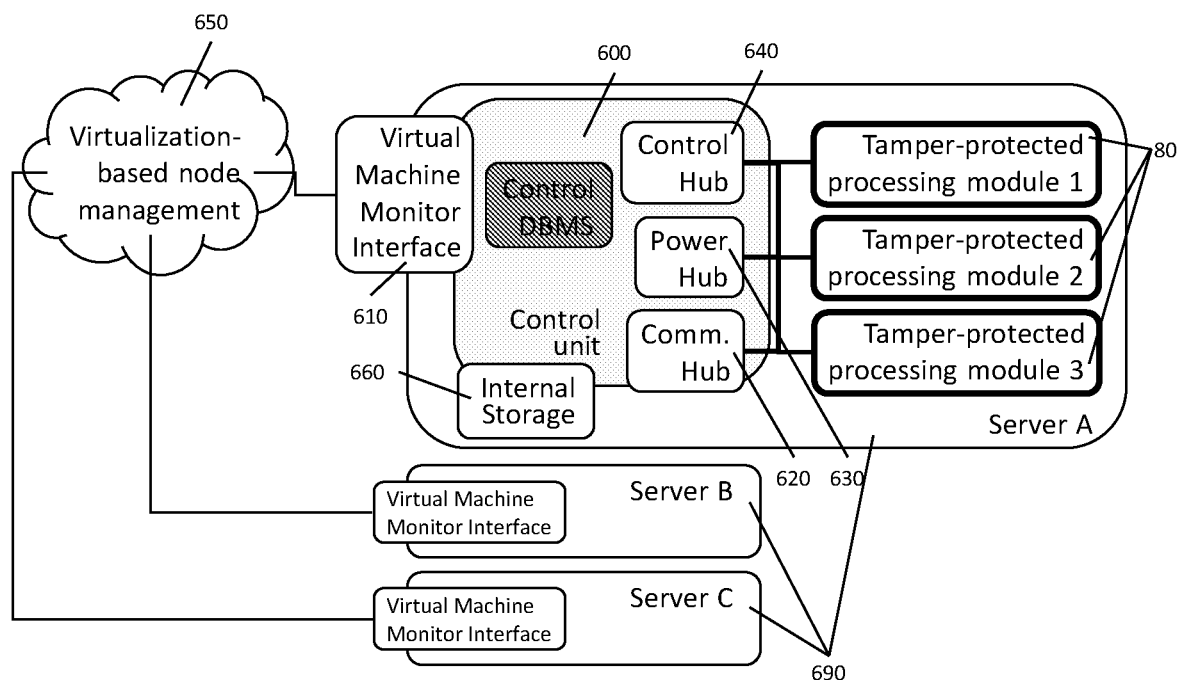

Local Instance Storage:

Each allocated tamper-protected computer module 80 may be provided with "local" storage by the control unit 600. For example, the control unit 600 may be arranged to expose segments of server 690 internal storage 660 (physically external to the module 8 but physically internal to the server 690; FIG. 6) or attached storage 670 (physically external to both the module 80 and the server 690; FIG. 7) to each tamper-protected computer module 80 transparently as ISCSI "volumes" or corresponding, following a certain predefined naming convention. For instance:

'temp' may denote a small disk that can be used by the module 80 to download digital software images (download storage).

'guest-X' may denote a disk meant to be used by the virtual guest machine for general data storing, where X is an index number.

'boot-X' may denote a disk meant to be used by the boot host, where X in an index number.

Attached Cloud Storage:

Additionally, each allocated virtual guest machine instance running inside a particular tamper-protected computer module 80 may be provided with remote cloud-hosted storage 645 by the control unit 600. To this end, the control unit 600 is arranged to interact with one or more cloud storage services, such as the OpenStack Cinder or AWS EBS block storage services, to access cloud-hosted storage volumes, and to re-export them as ISCSI targets, or similar, to the tamper-protected computer module 80 in question. The control unit 600 then may act as an intermediary proxy for the cloud storage service 645 to enable modules 80 to make use of cloud storage without having to know about or interact with the cloud storage service 645. (FIG. 7). Alternately, the storage volumes may be set up to be connected directly to the modules over the network without the intermediation of the control unit 600.

Boot and Download Storage:

Further, to enable instances to properly boot, the control unit 600 may be arranged to expose additional storage over protocols such as HTTP and TFTP, at pre-defined URLs. For example, each module 80 is allocated its own directory, under which the control unit 600 stores boot files to be exported to the module 80 in question. This is available to the module 80 over TFTP and HTTP protocols at a particular predefined IP address, or corresponding, and using a pre-defined directory structure layout.

Hence, at least one of the tamper-protected computer module 80 as such may, directly, and a virtual guest instance running on the module 80 in question, have access to respective digital storage space as mediated by the control unit 600.

In general, in an embodiment the computer server device 690 comprises, or is arranged to be connected to, a memory area 645, 660, 670 of which at least one connected tamper-protected computer module 80, and/or its corresponding instance, is allocated a respective isolated memory area part. Furthermore, according to this embodiment, the server control unit 600 comprises functionality for providing secure access to the said isolated memory area part 645, 660, 670 for the tamper-protected computer module 80 in question, and/or to an instance running on said module 80, as the case may be.

As described above, in one embodiment, each tamper-protected computer module 80 is arranged with a respective module-internal communication interface 136 arranged to be connected to the said information processing module 128 of the tamper-protected computer module 80 in question, which is a physical information processing module as discussed above. In one embodiment, all external wired and digital communication provided to the information processing module 128 must pass via said module-internal interface 136, and the module control unit is arranged with a set of module-specific tamper-protection and information protection functionality, as has also been described in detail above.

The module control unit is arranged to control the behaviour of the tamper-protected computer module 80 in which it is comprised. The module control unit may be implemented in hardware, software or a combination thereof, and may for instance comprise or be constituted by the communication bridge 152 and/or the internal IPM decoupler 136. The module control unit may be a separate unit, from a hardware and/or software perspective, than the IPM 128 of the module 80 in question.

It is generally preferred that the computer server device 690 is arranged with a physical form factor suitable for mounting in a standard server rack structure.

Given the nature of modern data centers, it is important to provide a design in which installing a new module 80 into a computer server device 690 can be done with minimal disturbance to the operation of the computer server device 690 and any other installed modules 80. This is particularly important if the computer server device 690 itself and one or several of such modules 80 are currently running. The concept of "hot install" is used to denote a process allowing such installations without compromising other such modules 80.

In such a hot install, a module 80 is inserted into its corresponding slot 605 and powered up. The module 80 is then arranged to automatically power on and to send out a module 80 identification message NEW_BLADE through its networking interface 156.

The NEW_BLADE message is signed with the module's 80 secret private key. The NEW_BLADE message may comprise one or several of the UUID of the module 80, the MAC address of the module 80, its configuration parameters, its tamper status, its battery status, a description of its resources (memory, CPU cores, core frequencies etc.), and the content of its witness registers (WR0, WR1, . . . ).

The control unit 600 is configured to receive and process such NEW_BLADE module 80 identification messages automatically, and in reaction thereto to update the management data structures accordingly to reflect the newly inserted module 80. Hence, no manual actions on behalf of system administrators are needed.

Initialization

In general, and again with reference to FIG. 16, a method according to the invention for initiating a computer process in a tamper-protected environment comprises the following steps.

In a first step, a computer server device 690 according to the present invention is provided.

In a subsequent step, at least one tamper-protected computer module 80 is provided and connected to one of the physical connections 605 of the computer server device 690. As described above, the physical connection 605 will connect the module 80 electrically and physically to the control unit 600. In the case in which the module 80 is as described above, the physical connection 605 will also establish an indirect electrical wired communication between the computer server device 690 and the IPM 128 of the module 80, and possibly between the computer server device 690 and any instance running on the IPM 128, mediated by the module 80 internal control circuitry.

In a possible subsequent initiation step, the computer server device 690 provides power to the inserted tamper-protected computer module 80 in question, which as a result thereof automatically powers up; the tamper-protected computer module 80 sends information of the above-described type regarding its current state, such as in the above-described NEW_BLADE message; and the computer server device 690 reads the sent information and updates a status information register regarding the tamper-protected computer module 80.

In one embodiment, the tamper-protected computer module 80 is arranged to sign said information regarding its current state using a private cryptographic key, such as a private PKI (Public Key Infrastructure) key, which private key is private to the tamper-protected computer module 80. Moreover in this case, the computer server device 690 that reads the sent information also verifies the signature in question using a public key, such as a public PKI key, corresponding to the said private PKI key.

In a subsequent step, the computer server device 690 receives, via its virtualization inters face 610, a resource allocation request from the network to which it is connected.

In a subsequent step, the computer server device 690 automatically allocates, in reaction to the said received request, the said tamper-protected computer module 80, whereas said allocation step may comprise multiple hardware and software sub-steps, including power-cycling, security state re-setting, network bridges setup, storage setup and connectivity, etc.

In a possible subsequent execution step, the computer server device 690 automatically provides, to the tamper-protected computer module 80, a digital data image comprising executable software code; the tamper-protected computer module 80 loads said data image into its information processing module 128; and the information processing module 128 executes said executable software code. This will be detailed below.

Each module 80 may have a unique ID, unique PK/SK public/private key pairs and a unique MAC address. Removing a module 80 from the server computer module 690 may involve a number of steps, including: (i) disabling the module 80 for new allocation by marking it as such in the appropriate management data structures, (ii-a) waiting for the current module 80 workload to finish executing or (ii-b) migrating the workload to a different module 80, (iii) shutting down the module 80, and (iv) physically removing the module 80 from its slot 605.

Note that no manual action on behalf of operators is required. Unlike in a standard CPU hypervisor, traditionally managing virtualization on a single standard motherboard, the control unit 600 is arranged to keep track of occupied slots 605, and when a new module 80 is inserted into the same slot 605, the automatic identification steps outlined above guarantee that the corresponding information is updated properly and the removed module's 80 identifying information is purged from the system or at least disassociated from the respective slot 605.

In a cloud or data center 650 scenario, the control unit 600 interacts with the cloud 650 node management mechanisms, provides information about the available resources (number and types of modules 80, allocation status etc.), responds to new "instance" allocation requests by allocating the resources of one or more modules 80 and configures any additional resources (physical, electrical, networking, storage etc) needed to transparently allocate the module for use by remote clients.

As discussed above, the resources of a module 80 may be allocated using several different mechanisms. In particular, each module 80 may be operated according to at least one of a number of operating modes, with respect to how the module 80 is virtualized, including: (i) barebone, (ii) hosted, (iii) shared exclusive, and, (iv) shared non-exclusive. In the following these operating modes are detailed.

Figure 9:
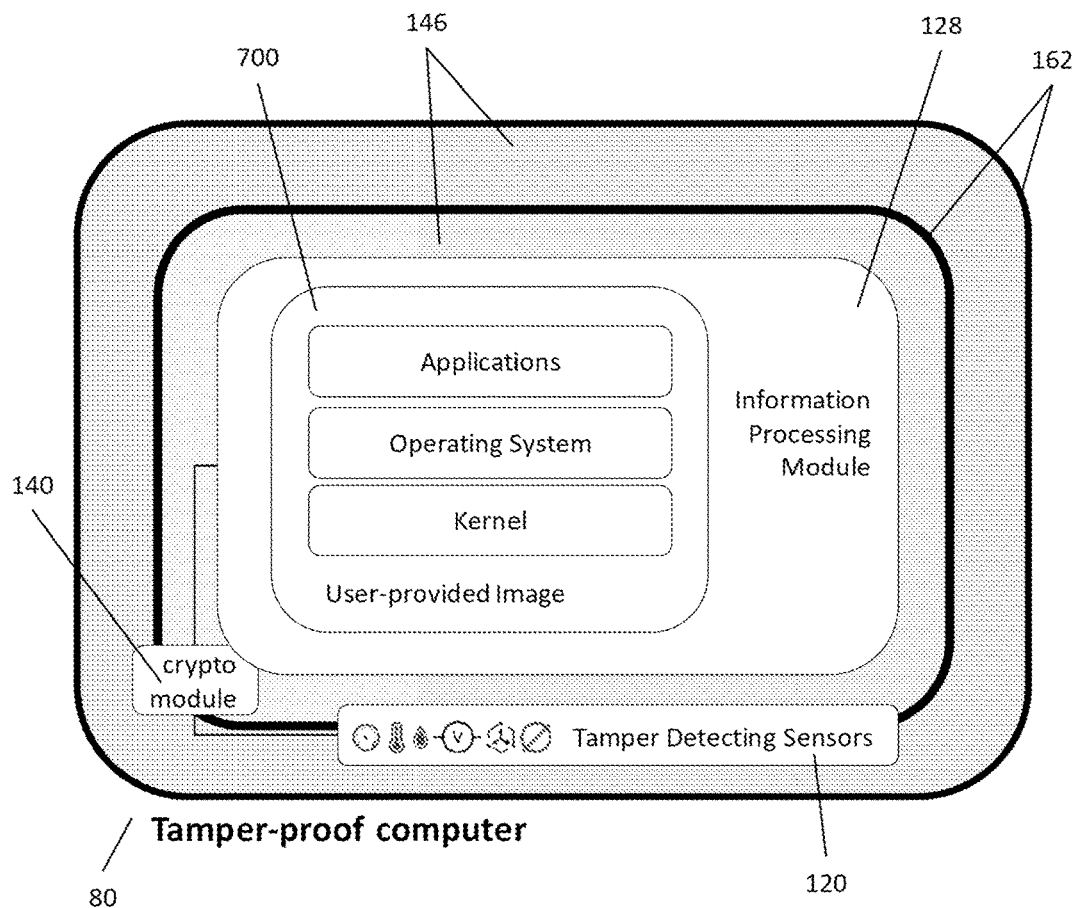
FIG. 9 is a schematic view of a first tamper-protected computer module according to the invention, and in particular showing a "bare instance" overview.
Figure 10:
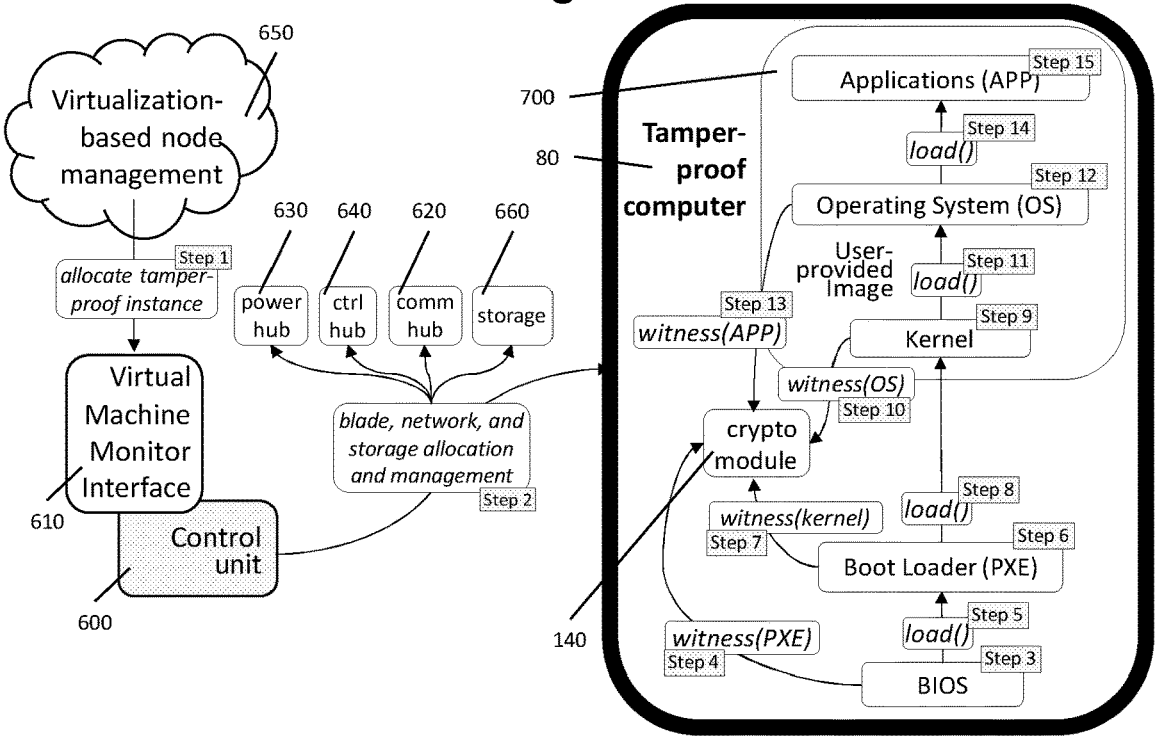
FIG. 10 is a flowchart showing a method for allocating the tamper-protected computer module illustrated in FIG. 7, in particular for a "bare instance"
Figure 11:
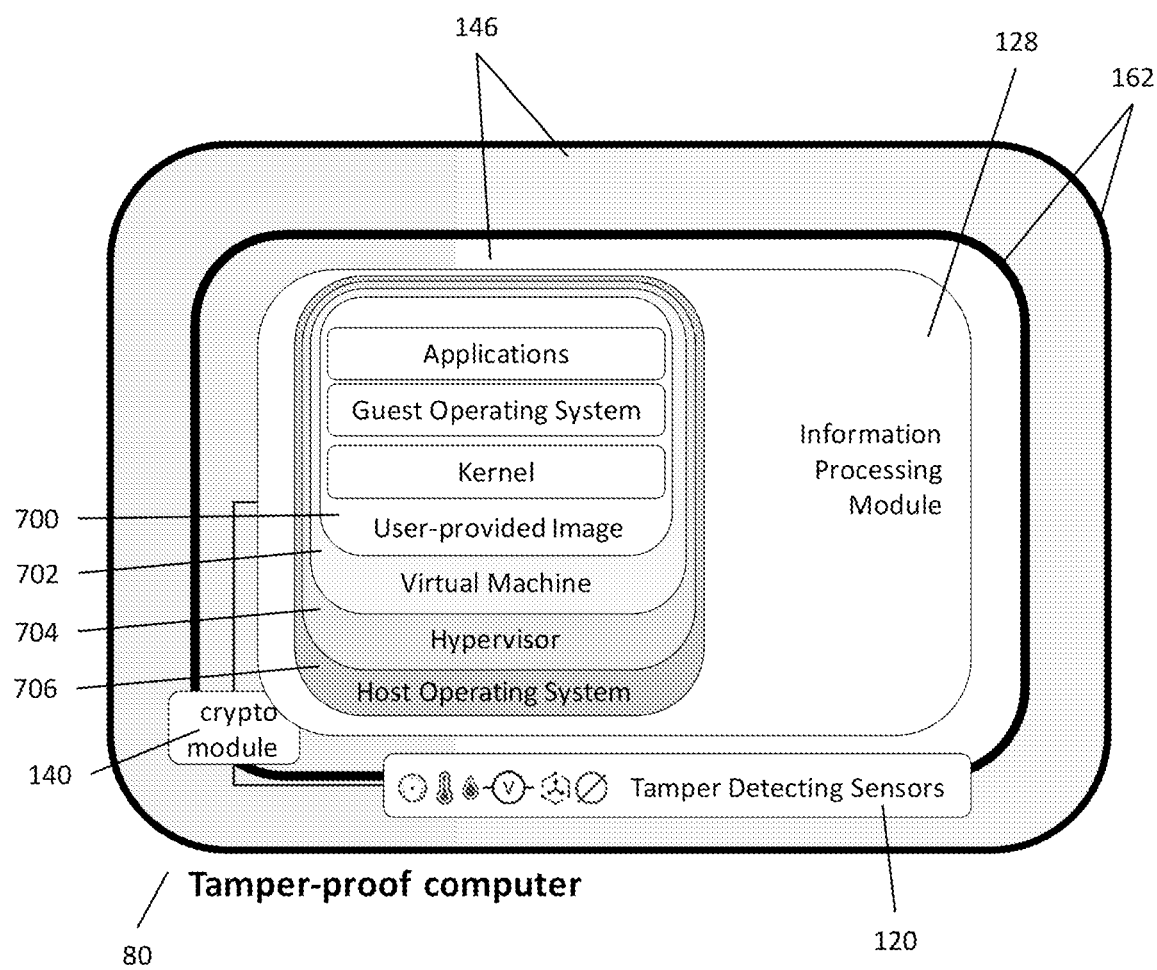
FIG. 11 is a schematic view of a second tamper-protected computer module according to the invention, and in particular showing a "hosted instance" setup.

Bare Instance:

A "bare instance" (or "barebone" instance) corresponds to a tamper-protected computer module 80 running a user-provided data image 700 (comprising executable computer code) directly on the hardware itself (FIGS. 9 and 10). The user-provided image 700 may contain a kernel, an operating system, and various applications running inside the operating system. Alternately, the user-provided image 700 may comprise any software that can be executed on the IPM 128, e.g., key management software, missile guidance, electronic cash and payments software etc. without necessarily requiring a kernel or an operating system. As is illustrated, for exemplifying purposes, in FIG. 10, a first data image is loaded into the IPM 128, such as from the control unit 600 or from an external memory as described above. This first data image may be predetermined, and used for each new bare instance initiation of the type of module 80 in question. This first image may comprise executable software code corresponding to a BIOS and a boot loader which is loaded by the BIOS. The boot loader in turn is arranged to load a kernel of a user-provided data image 700, comprising a kernel, arranged to load an operating system in turn arranged to load at least one user-specific application. This second image may be provided by the user requesting the allocation. As seen in FIG. 10, any or all steps in this procedure may be witnessed, using the crypto module 140 of the tamper-protected computer module 80.

Hosted Instance:

In a "hosted instance" (FIG. 11), the IPM 128 runs a hypervisor 704, possibly on top of a host operating system 706. The hypervisor 704 then in turn provides a virtual machine 702 within which a user-provided image 700 of the said type may run. It is noted that this hypervisor 704 is a module hypervisor, and not the same as the digital virtualization interface 610 used on the server 690 level.

Shared Instance:

In a "shared instance" (FIG. 12), the IPM 128 runs a module hypervisor 704, possibly on top of a host operating system 706. The module hypervisor 704 then in turn provides one or more virtual machines 702 within which (possibly different) user-provided images 700 may run. The module 80 can then be effectively shared across multiple virtual machines.

In an "exclusive shared instance" setup, the module 80 may ensure that all the user-provided images are trusted or are provided by the same user, or otherwise satisfy a certain relationship agreed-upon by their providing users. For example, several financial institutions may reach agreement to allow each other's workloads to use shared instances running within the same physical module 80.

In shared and hosted instances, access to the services of the underlying tamper-protected computer module 80 is virtualized and provided transparently to the virtual machines in question. For example, the cryptographic and control services and the services offered by the hardware crypto module 140 can be accessed through serial devices exposed automatically inside the virtual machine 702 and available to the user-provided code running inside the user-provided image 700.

In general, the computer server device 690 may be arranged to provide, to the at least one connected tamper-protected computer module 80, virtualization software, in turn arranged to be executed on the tamper-protected computer module 80 in question and to therein provide a virtualized computer environment comprising at least one, preferably at least two, virtual computer devices 702 individually accessible by the server control unit 600 via a module virtualization interface, such as said module hypervisor 704.

This module virtualization software may be arranged to be executed on the information processing module 128 of the module 80 in question, and the virtualized computer environment is arranged to provide at least one virtual computer device 702 run on the information processing module 128 in question. Specifically, the virtualized computer environment may be arranged to divide the information processing module 128 in question into at least two such virtual computer devices 702.

Alternatively, the module virtualization software may run on the module control unit of the module 80 in question, or on any additional information processing modules 128 that may be connected internal to the module 80 in question.

Moreover, the information processing module 128, or the other entity executing the module virtualization software, may then be arranged to provide security-related services, such as witnessing and/or key management services, to computer code executing on the said virtual computer devices 702, such as via the crypto module 140.

The above-described module virtualization software, preferably acting as a module hypervisor, in itself provides a certain logical isolation of the user-provided image from the underlying hardware, as well as protecting the individual module 80 in a way which restricts possibly harmful external party access to certain functionality of the module 80. For instance, the software may typically be configured to prevent BIOS flashing of the IPM 128.

Hence, even one virtual computer devices 702 with one single virtualized instance provides certain advantages, although having two or more virtualized instances running on the hardware of one single IPM 128 provides additional advantages.

Barebone Instance Allocation

In a barebone instance allocation, the control unit 600 is arranged to provide to the module 80 one or more network addresses (e.g., an IP address), allocated for the instance, by an instance-external party, for example the control unit 600 or the cloud 650 management layer. Communication between the module 80 and the control unit 600 may happen automatically and directly, e.g., between the control unit's fixed network address and the module's 80 given network address.

In the case of hosted or shared modes, the control unit 600 may be arranged to allocate a separate fixed network address to the host OS 706 or module hypervisor 704 running inside the module 80. Any network addresses allocated by the cloud 650 management layer for the hosted or shared instances are allocated to the virtual machines 702 running inside the module hypervisor 704 which runs on top of the host OS 706 or directly on the IPM 128 hardware itself.

Overall, in this case, network addresses and routes are set up so that communication can reliably occur between the host OS 706 and the control unit 600, the VM instance 702 and the control unit 600, and the VM instance 702 and the host.

Barebone allocation, on the other hand, may comprise several or all of the following sequential steps (FIG. 10):

1. The control unit 600 receives a request from the cloud 650 management layer to allocate one or more barebone instance(s). The allocation request includes (possibly by reference) one or more user-provided images to be executed by the allocated instance.

2. The control unit 600 identifies an available unoccupied module 80, prepares and updates the corresponding configuration and storage structures and powers the module 80 on.

3. The module 80 powers on and executes its PXE bootloader which measures itself using the witnessing service exposed by the security anchor 140.

4. The bootloader then fetches the user-provided image 700 from the control unit 600 and witnesses the image 700 using the witnessing service exposed by the security anchor 140.

5. The bootloader executes the user-provided image 700.

6. The kernel, operating system, and software applications within the user-provided image execute. The kernel, OS or software applications may use the witnessing service exposed by the security anchor 140 to measure additional information, such as loaded applications and keys. For example, the kernel may first measure the OS before loading it. The OS may then measure the software applications before loading them. The software applications may measure different software-specific data before starting.

Such measurements enable remote users to validate the integrity of the entire loaded software stack and link it to the identity of the allocated instance in an authentication and remote attestation protocol.

For example, before starting, a SSH (Secure Shell) server running inside the instance 700 may measure the public key provided to the instance by the cloud 650 management layer. This provides SSH clients the ability to mutually authenticate with the SSH server and also link the SSH server identity with the entire loaded software stack, and thus prevent impersonation or man-in-the-middle attacks.

Hosted and Shared Instance Allocation

Hosted instance allocation steps include all the steps of the barebone allocation, but instead of loading the user-provided image 700 directly on top of the hardware, an (optional) host OS image 706 and a module hypervisor 704 are first measured and loaded.

The host OS 706 then executes (if loaded), followed by the module hypervisor 704. The module hypervisor 704 then creates a virtual machine 702 within which it loads the user-supplied image 700 after first measuring it using the witnessing service exposed by the security anchor 140. The host OS 706 or the module hypervisor 704 then set up the necessary networking fabric (interfaces, tunnels, firewall rules) to enable the necessary communication between the instance, the host and the control unit 600.

Further, the module hypervisor 704 may also virtualize access to the underlying witnessing service (as a virtualized crypto module 145, see FIG. 13) of the security anchor 140 so that the user-provided image 700 can access and use it, e.g., for measuring any additional applications loaded.

Finally, the control unit 600 may provide access to storage, such as a partition of a local disk or said networked storage array 670 connected to the control unit 600. In that case, the module hypervisor 704 and host OS 706 also set up the storage in question for the allocated instance, by for instance decrypting and encrypting the storage with a randomly generated encryption key, and optionally persisting the key in the crypto module 140. This can be also used to perform a secure reboot and resume of the instance in question, allowing the encryption key to be recovered from the crypto module 140 and thus access to the encrypted storage volume. See FIG. 14.

In general, the said executable software code comprised in the said user-provided data image 700 comprises a computer software program which the user wishes to execute on the tamper-protected computer module 80, and in particular on its IPM 128. The executable software code in question may also comprise an operating system (OS) arranged to execute the computer software program, and preferably also a kernel arranged to allow the operating system in question access to hardware functionality of the information processing module 128 of the tamper-protected computer module 80. It is realized that this kernel may be arranged to operate on top of the virtualized hardware exposed by the module hypervisor 704, as the case may be.

The data image may be loaded into the information processing module of the tamper-protected computer module 80 and replaces any previous data image loaded therein.

Further, and as described above, the data image may be loaded into a virtual machine 702 running on the information processing module 128 of the tamper-protected computer module 80, which virtual machine 702 is exposed to the computer server device 690 via a module virtualization interface 704 provided by module virtualization software run by the tamper-protected computer module 80, such as on its information processing module 128.

In particular, the said module virtualization software may further provide access for said executable software code, of the user-provided image 700, to services provided by the module control unit of the tamper-protected computer module 80 in question. Such services may include security and witnessing functionality as described herein.

Additionally, the crypto module 140 can be configured in such a way as to allow access to the stored encryption key only if the currently loaded software stack (or the associated witness register value) is identical to, or in an agreed-upon relation to, the stack (or witness register value) loaded when the key was stored first. This provides a simple mechanism to securely release the stored encryption key when needed after a reboot if and only if the s1 user-provided image, and all other loaded components, are the same as when the key was stored first.

Figure 12:
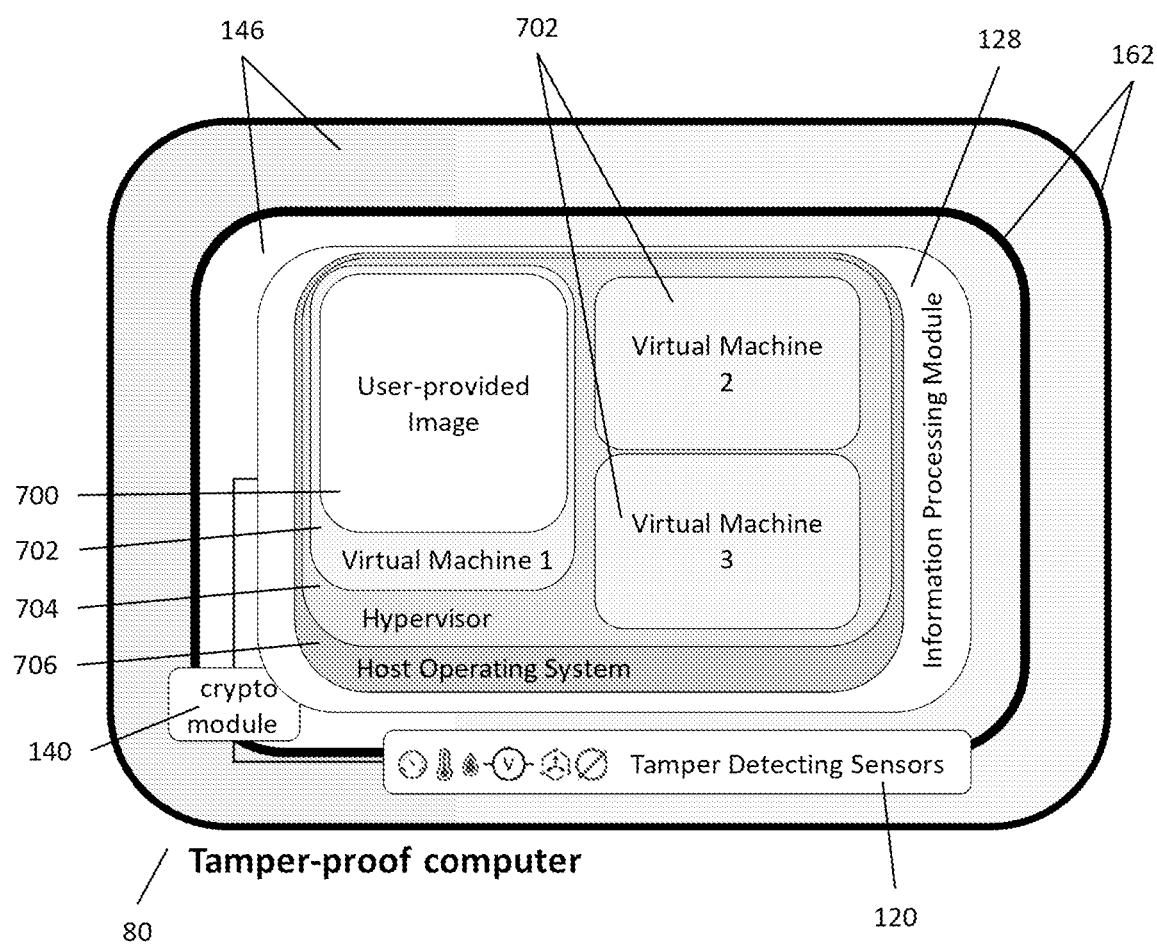
FIG. 12 is a schematic view of a third tamper-protected computer module according to the invention, and in particular showing a "shared instance" setup with three instances.
Figure 13:
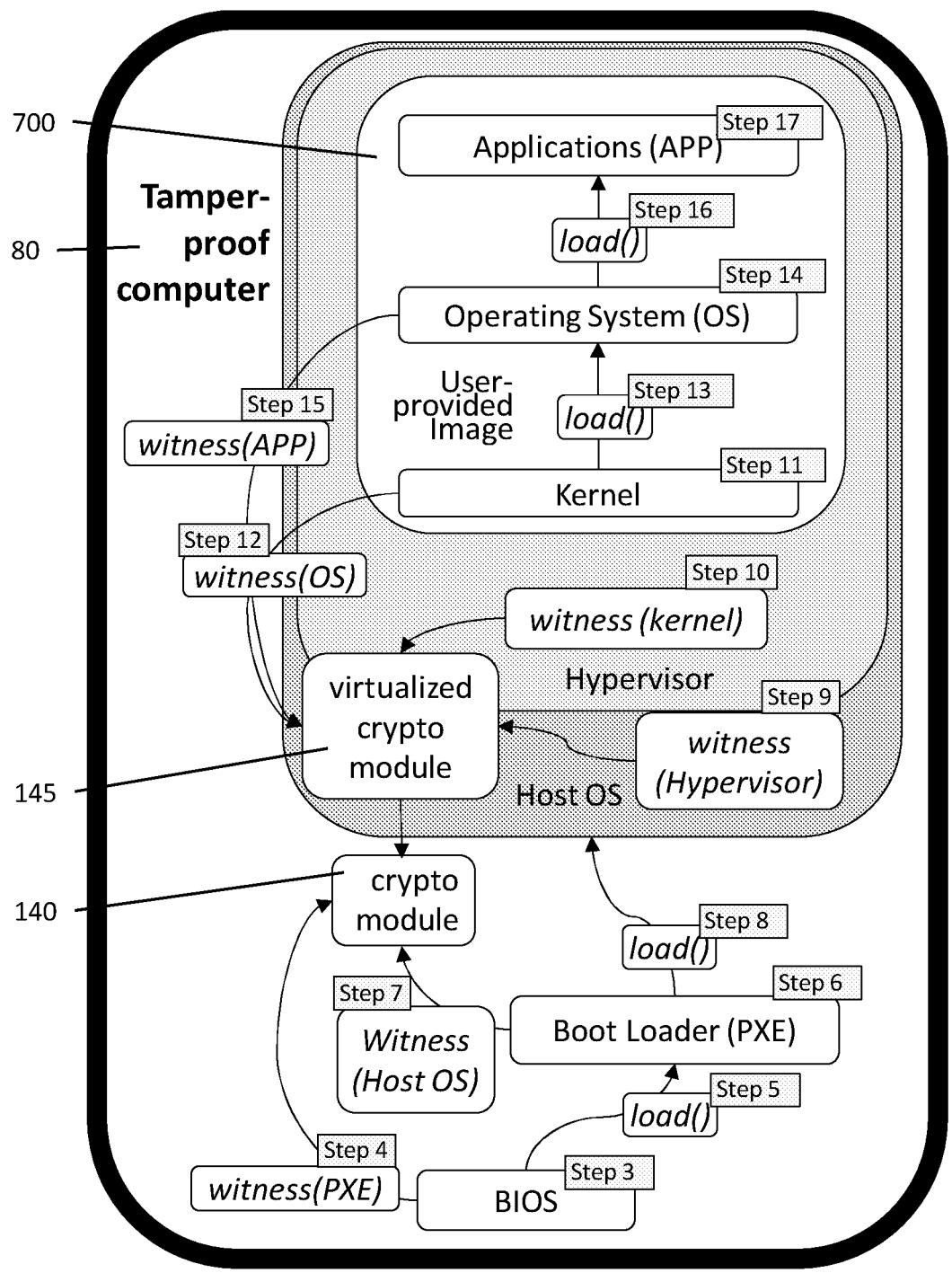
FIG. 13 is a flowchart illustrating the initiation of a tamper-protected computer module according to FIG. 11 or 12, and in particular a security anchor which is virtualized and exposed to a user-provided image in a hosted or shared mode.
Figure 14:
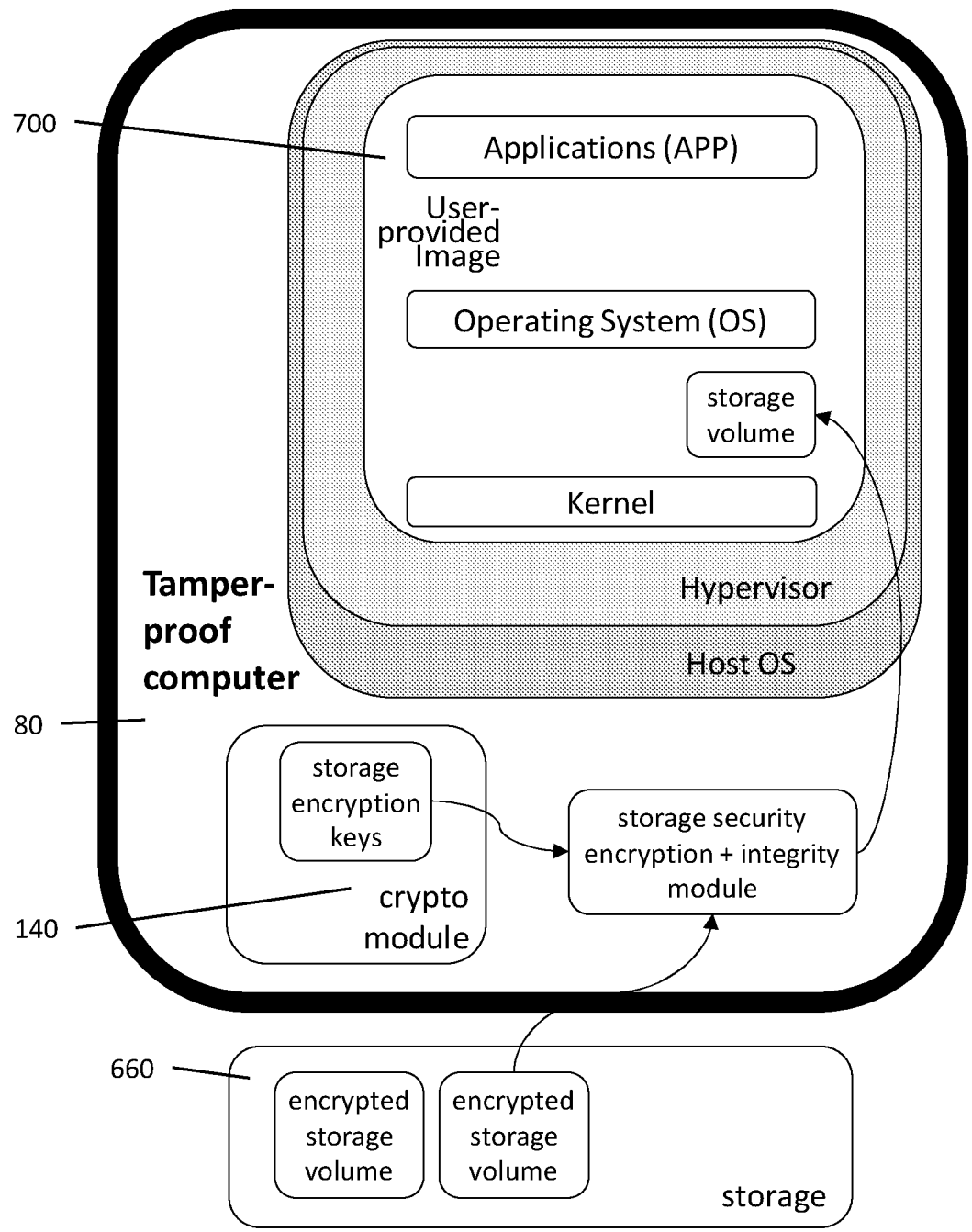
FIG. 14 is a schematic view of a fourth tamper-protected computer module according to the invention, and in particular how transparent storage security (encryption, information integrity, volume integrity) can be provided for a user-provided image.

Shared mode allocation differs only slightly from hosted mode allocation, in that now instead of a single VM 702, the module hypervisor 704 allows multiple VMs 702 to run, as illustrated in FIG. 12. All other steps are performed as necessary to enable multiple VMs to run within the module hypervisor 704.

In shared exclusive mode, to guarantee that a physical tamper-protected computer module 80 is exclusively allocated between users from the same organization only, the cloud management layer 650 may keep track of which modules 80 are allocated to which organization. Alternately, user-provided images 700 may be digitally signed by their respective organizations and the loading procedure ensures that all images loaded within one module 80 are signed by the same organization.

Instance Termination

During instance termination, a number of additional steps may be taken to ensure the desired security level.

In barebone mode, the tamper-protected computer module 80 may be power-cycled (including its motherboard and crypto module 140, and preferably its IPM 128) to erase any non-persistent (such as in-memory) state within the module 80 in question. Such power-cycling may be also performed during instance termination in shared-exclusive mode if all instances within the module 80 are to be terminated or the terminated instance is the last one running on the module 80 in question.

In shared non-exclusive mode, instead of power-cycling the entire module 80, only the execution of specific virtual machines may be halted, hence performed as a software event as opposed to the, hardware-based power cycling described above. However, the power cycling may be hardware-based.

In addition, prior to requesting termination, users can connect to the crypto module 140 and trigger the deletion of any persistent state within the crypto module 140 that may have resulted by the use of the services offered by the crypto module 140, such as key management.

In general, the server control unit 600 may be arranged to re-initialize a tamper-protected computer module 80 to a secure state, such as power cycling the tamper-protected computer module 80 or otherwise re-initializing it using suitable software functionality, once a task executing on the tamper-protected computer module 80 in question is finished and the tamper-protected computer module 80 is to be removed from the computer server device 690 or the task reallocated to a different tamper-protected computer module 80.

In particular, a method for running a computer process according to the present invention may comprise the method steps of a method for initiating a computer process as described herein. Then, such a method further comprises a termination part in which the tamper-protected computer module 80 is power cycled.

Migration

Now turning to the question of instance migration, "live migration", or "instance migration", refers to the process of moving a running virtual machine or application between different physical machines without disconnecting the client or application. Memory, storage, and network connectivity of the virtual machine are transferred from an original guest machine to a destination guest machine.

The computer server device 690 may be configured to allow such migration from one tamper-protected computer module 80 to another. To do so securely requires a careful design that does not compromise the security of the data and workload while also readily integrating into existing clouds 650.

One mechanism that allows migration between two tamper-protected computer modules 80 proceeds as follows. Consider a user-provided image X 700 processing sensitive data Z running on an allocated module A 80. Upon receiving a request to migrate X, the computer server device 690, in conjunction with its own and other existing control units 600, may allocate a target module B 80, load the same user-provided image X 700, while specifying an additional option "migration mode receive". To achieve this, different computer server devices 690, and preferably respective control units 600 of such computer server devices 690, may be arranged to communicate directly with each other and to exchange information relevant to such migration activities. Alternatively or in addition thereto, a central control unit (not shown in the Figures) may be used, communicating with all connected computer server devices 690 and managing migration activities on a higher level.

The tamper-protected computer module B 80 is then arranged to, upon the reception of the migration message and upon request by the control unit 600 of the computer server device 690 to which it is connected, replicate all deterministic allocation steps (i.e. downloading and/or witnessing image data, etc.) starting an instance for image X. Thereafter, the module B 80 enters a wait loop to receive the sensitive data Z.

The control units 600 corresponding to the two blades A and B, respectively, may establish a secure network channel directly between them. Module A 80 then remotely verifies module B 80, (see below regarding details of remote verification), preferably including information regarding the crypto engine generation, family and certificate. Upon successful verification, module A 80 sends the sensitive data Z over a securely established channel to module B 80.

The sensitive data Z may for example comprise a root disk encryption key which has been used by module A 80 to encrypt an attached disk volume 670 which can then be used by module B 80 to decrypt and access the same attached disk volume 670, so that the migration of the executing user image can be performed seamlessly.

Migration of Key Management Information

If the crypto module 140 implements key management (KM) functions, for instance by implementing a Key Management Interoperability Protocol (KMIP) protocol compliant key manager, the sensitive data Z may also comprise crypto key management information maintained inside the crypto module 140. In this case, this results also in a secure key management information migration between the two crypto modules 140 of the modules A, B 80 involved in the migration (see below regarding secure KM import/export). For example, the source crypto module 140 may perform an export operation and the destination crypto module 140 may perform a corresponding import operation of said secure key management information.

In general, a method for running a computer process according to the present invention may comprise the method steps comprised in a method for initiating a computer process as described above. Such a method may then also comprise an execution migration step, in which at least part of the user-provided data image 700 is loaded into the information processing module 128 of a different tamper-protected computer module 80. Such an execution migration step may further comprise the setting up of a secure communication link between the two information processing modules 128 of the respective tamper-protected computer modules 80, as well as the transfer, over said secure communication link, of a cryptographic key using which an encrypted memory area to which access is provided by the server control unit 690 can be decrypted, as has been described above.

Using the cloud 650, remote users may be able to allocate module 80 instances of different types (barebone, hosted, shared exclusive, share non-exclusive, and/or any additional allocation modes) for the running of user-provided images 700. Such allocation may be performed completely using the already-existing, conventional allocation functionality of the cloud 650 management tools, and via the interface 610 presenting the hypervisor capability, which capability the cloud 650 management functionality recognizes as a standard hypervisor capability. After the cloud 650 performs the allocation in question, instances with the user-provided images 700 will be active and running. Hence, users of the cloud 650 may use the tamper-protected computer modules 80 in a way which may be identical, from the point of view externally to the interface 610, to the situation in which the computer server device 690 had been a conventional rack server, offering a virtualized execution environment executing on its own conventional processor.

Remote Verification

Before users make sensitive data available to an allocated module 80 instance, users may want to verify the security properties of the instance in question, including: (i) whether the module 80 on which the instance runs has been physically tampered with, (ii) whether the loaded and witnessed software stack indeed corresponds to the user-provided image 700, and (iii) whether anything else has been loaded into the instance after allocation.

One important step in the verification mechanism involves a remote user retrieving (possibly cryptographically signed) measurements made within the tamper-protected computer module 80 in question, and the verifying that the measurements are as expected.

To this end, a remote user may connect to the crypto module 140 inside the module 80 and request the crypto module 140 to digitally sign a message containing the current witness register(s), the current tamper-status of the module 80, a unique module 80 ID and/or other pertinent data.

This communication can be set up using a SSH connection to gain access to the running user-supplied image 700, and then access the services provided by the crypto module 140 from there, as described above. For barebone instances, accessing the crypto module 140 services can be achieved using specialized security anchor management tools. For hosted inio stances, accessing the crypto module 140 services can be performed through a virtualized device—corresponding to the underlying crypto hardware chip running the crypto module 140—set up from within the virtual machine.

In shared mode, because the blade contains multiple instances running in separate VMs or containers 702, the witnessing process may only measure the software stack up to but not including the actual user-provided images 700 and their VMs or containers 702. For example, this may include the BIOS, the host OS kernel, the host OS 706, and the module hypervisor 704.

To verify also individual VMs, each loaded VM may be measured separately in a witness register allocated for it within the crypto module 140.

In all these mechanisms, it is important to note that the actual verification itself and its corresponding computations and processing should be done remotely in a user-trusted environment, and not inside the possibly untrusted yet-to-be-verified instance.

Internal Key Management (KM)

Now turning to the question of internal (to the computer server device 690) cryptographic Key Management (KM), this relates to the generation, exchange, storage, use, crypto-shredding (destruction) and replacement of such cryptographic keys, including cryptographic protocol design, key servers, user procedures, and other relevant protocols.

The Key Management Interoperability Protocol (KMIP) is an extensible communication protocol that defines message formats for the manipulation of cryptographic keys on a key management engine. Similarly, the PKCS #11 standard defines a platform-independent API to cryptographic tokens, such as hardware security modules (HSM) and smart cards. The API defines most commonly used cryptographic object types (RSA keys, X.509 Certificates, DES/Triple DES keys, etc.) and all the functions needed to use, create/generate, modify and delete those objects.

The crypto module 140 may implement key management (KM) functions. For example, it may provide a PKCS #11 KMIP-compliant key management service to both "local" (with direct access inside the module 80) and remote users to manage cryptographic keys and objects stored securely and protected by the crypto module 140.

Both local and remote clients can securely connect to the crypto module 140 using the TLS (Transport Layer Security) protocol and access its key management services.

In practice, using such a setup, the crypto module 140 of the tamper-protected computer module 80 constitutes a hardware HSM (Hardware Security Module), which is internal to the module 80 and arranged to provide security services to processes running on operating systems inside the IPM 128 of the module 80, and/or to such processes or operating systems running on virtual machine instances in the IPS 128, as the case may be.

KM Data Export and Import

In addition to the key management services as such, in many cases it is also important to provide mechanisms for secure migration of key management data from one crypto module 140 to another crypto module 140, arranged as parts of different tamper-protected computer modules 80. Such key management data migration may be used, for instance, during instance migration as described above, but also for instance cloning, backup of cryptographic material, and so on.

In the following, method steps for importation and exportation of key management data will be described. As used herein, "key management data" may comprise any data directly relevant to the cryptographic state of a particular module 80, IPM 128 or instance, and in particular any private PKI cryptographic keys and/or certificates stored in a crypto module 140 of the type described herein.

Consider a first crypto module 140 A running a KM service. The crypto module 140 may contain internal information used by the KM service (encryption keys, certificates, etc), a selection of which a user desires to export and then import into another target crypto module 140, or simply backup for later use by the same first crypto module 140.

Figure 15:
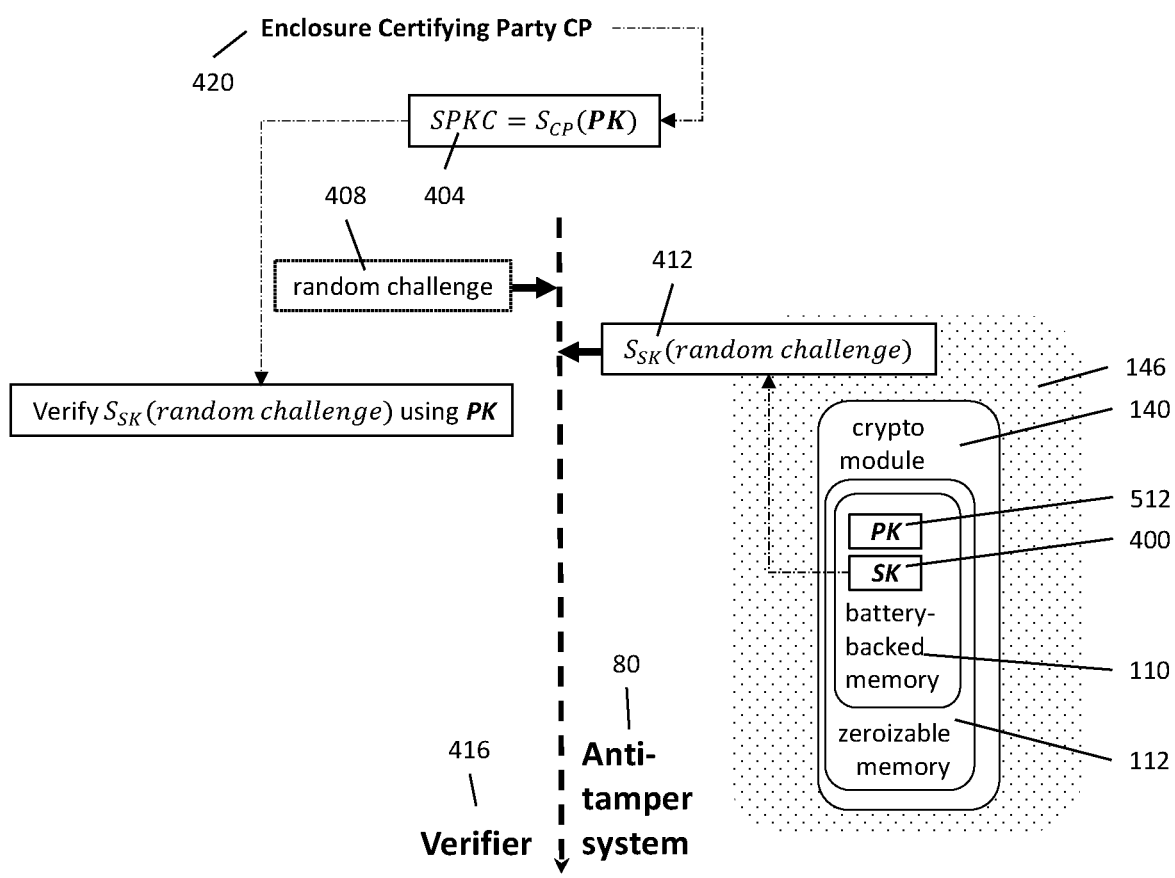
FIGS. 15-17 are respective flowcharts illustrating methods for cryptographic key manages ment and initiation, suitable for use in a method according to the invention, of which in particular
Figure 17:
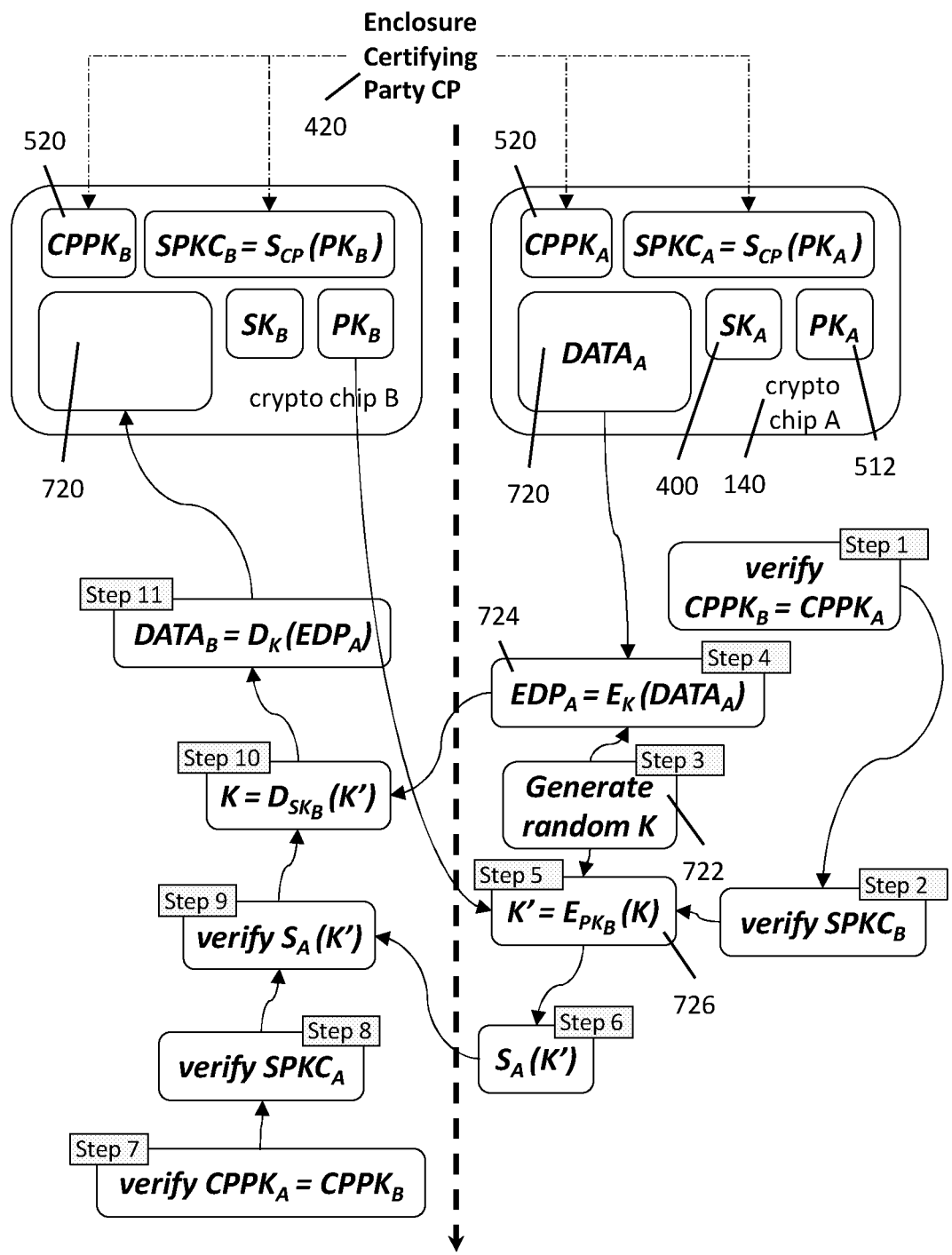

Export:

To this end, the user will first retrieve a public cryptographic key $PK_B$ 512 associated with a target crypto module B 140 and a corresponding public key certificate $SPKC_B$ (Specific Public Key Certificate) 404 issued by a certifying party 420 (see FIGS. 15 and 17).

The user provides $PK_B$ and $SPKC_B$ to a source crypto module A 140. Crypto module A 140 verifies that: (i) $SPKC_B$ indeed certifies public key $PK_B$, and (ii) a public key certificate $SPKC_A$ of crypto module A has also been issued by the same certifying party 420 as $SPKC_B$. This also implies that a public key of the certifying party of crypto module A 140, $CPPK_A$ 520, is the same as a public key of the certifying party of crypto module B 140, $CPPK_B$ 520. Alternatively, crypto module A 140 may verify that another acceptable relationship between the two certificates or certifying parties exists.

If the verification succeeds, crypto module A 140 then generates a random encryption key K 726, encrypts K 726 with crypto module B's 140 public key $PK_B$ 512, signs the result K' with crypto module A's 140 own private key $SK_A$ 400, and outputs the signed result $S_A(K')$. Crypto module A 140 also encrypts the user-selected KM data $DATA_A$ 720 using said key K 726, and outputs the resulting encrypted data $EDP_A$ 724. Finally, crypto module A 140 also outputs $CPPK_A$ 520, $SPKC_A$ 520, and $PK_A$ 512. See FIG. 17.

Import:

The user may either store the output values ($EDP_A$ 724, $S_A(K')$, $SPKC_A$, $PK_A$ 512, $CPPK_A$520) for backup purposes, or transfer them to the target crypto module B 140 for import. Crypto module B 140 then verifies that: (i) $SPKC_A$ indeed certifies public key $PK_A$ 512, and (ii) crypto module B's 140 public key certificate $SPKC_B$ has also been issued by the same certifying party 420 as $SPKC_A$. Alternately, crypto module B 140 may verify that another acceptable relationship between the two certificates or certifying parties exists.

If the verification succeeds, crypto module B 140 may verify the signature $S_A(K')$ and then decrypt key K 726 from K' using its own private key $SK_B$. Using K 726, the crypto module B 140 may decrypt the EDP data and store it in its corresponding internal locations.

Overall, the two modules A and B may perform any other type of key establishment protocol (e.g., such as RSA key exchange, Diffie-Hellman, STS, etc) between each other, either interactively or non-interactively, and then exchange the security data encrypted with the resulting session key. The key exchange may also be augmented to establish the fact that there exists an acceptable relationship between the exporting and importing parties' certifying authorities 420, as well as mechanisms to handle incomplete or invalid entries.

For clarity and efficiency, this disclosure provides various descriptions relating to decoupling, installation, removal, replacement, and changing of an IPM 128, and to apparatuses and processes for providing such functionality. While such descriptions of the invention were often made throughout this disclosure with reference to an IPM 128, it is to be understood, that such descriptions may additionally or alternatively apply to any other components of the CPC of a tamper-protected computer module 80 of the present type, that are capable of being both physically and logically decoupled from the module 80 in question. In principle, such components are not required by the security certification process to be an intrinsic part of the module 80; they may be able to be installed, removed, replaced, changed, or decoupled without affecting the security certification status of the module 80. Hence, what has been said herein with respect to the IPM 128, in terms of decoupling, installing, removing, replacing, and changing an electronic component, is in general also applicable to other modules. For instance, the internal IPM decoupler 136, while referred to as an internal IPM decoupler for clarity of this disclosure, may be configured to connect to, such that the tamper-protected computer module 80 may utilize the functionality of cryptographic or other type of circuitry instead of an IPM 128.

Furthermore, the present invention relates to a computer server system, comprising a computer server device 690 according to the above, which computer server system 690 further comprises at least one, preferably at least two, tamper-protected computer modules 80 according to the above, connected to different physical connectors of said computer server device 690.

Moreover, the present invention relates to a computer software program arranged to execute on a computer server device 690 of the present type. In general, such computer software code is arranged to be loaded into the computer server device 690 in question, and to be executed on a CPU thereof, and as a result it may be arranged to perform some or all of the computer server device 690 functionality described above.

In particular, the computer software program comprises functionality for communicating with at least one, preferably at least two, tamper-protected computer modules 80 of the present type, each connected to the computer server device 690 via a respective physical connection 605 and each comprising said respective module control unit and a respective information processing module 128, as has been described above. Furthermore, the said computer software program is arranged to, when executed, expose the digital virtualization interface 610 on the network to which the computer server device 690 is connected, providing access for other devices on said network to respective virtual computer devices corresponding to each of the said one or several tamper-protected computer modules 80. Also, the said computer software program is arranged to receive calls directed to each such virtual computer device, to produce corresponding calls to a corresponding tamper-protected computer module 80 and to deliver such corresponding calls to the corresponding tamper-protected computer module 80 in question. Such communication, which is preferably bidirectional, has been described in detail above, and may be handled through said interface 610. Correspondingly, the computer software program may also be arranged to setup and manage modules 80.

Hence, the computer software program may be arranged to receive from clients, through said virtualization interface 610, requests for allocation/de-allocation and general management of logical and physical system and network properties of said tamper-protected computer modules 80 and, in response thereto, to perform the appropriate dynamic configuration, setup and physical and logical control actions (for example electrical, reset, networking and storage setup actions) necessary to respond correctly to the received requests.

Moreover, it is often desirable that such underlying activity in support of the response be transparent to the requesting externally arranged clients, to the extent that such clients will not need to know whether the computer server device 690 in question is a standard hypervisor on standard non-secure hardware running virtual machines in a standard CPU, or whether the allocated virtual machines are in fact tamper-protected computer modules 80 of the present type.

Figure 18:
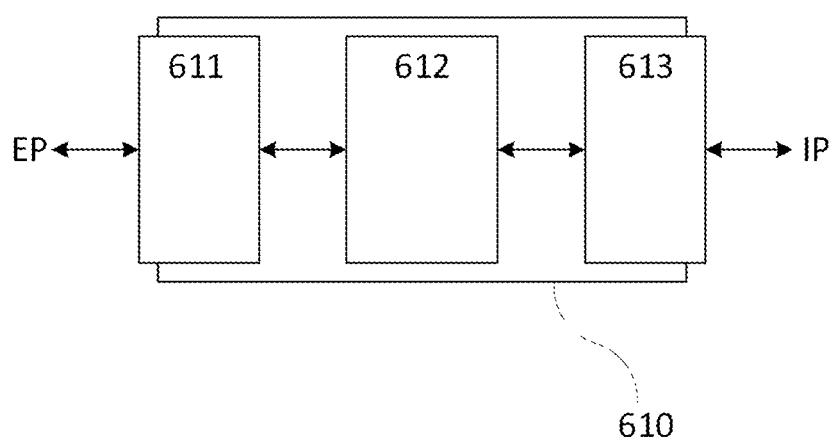
FIG. 18 is an overview of a digital communication interface according to the present invention.

In addition thereto, the present invention also relates to the said digital computer interface 610 itself, comprising an externally exposed interface part 611 and an internally exposed interface part 613. This is illustrated in FIG. 18. It is noted that this interface 610 can be seen both as a functional component within the computer server device 690 (interface device 610) or an interface in its own right (logical interface 610).

The externally exposed interface part 611 is visible and made available to other devices EP present on the network to which the computer server device 690 is connected, and is arranged to provide, to such external parties EP, digital, electronic communication services, and typically also allocation setup and management services, as described above. Such services relate to computing resources for performing computing tasks, and in particular aim at, and result in, the allocation of such computing resources for performing computing tasks. For instance, computer code may be loaded onto said allocated computing resources, such as in the form of user-provided images as described above, and executed. In particular, the said computer resources may be in the form of said virtual computer devices or ins stances, each corresponding to or being executed on a respective tamper-protected computer module 80 as described above, and in particular on a respective IPM 128. For instance, communication services of the said type may comprise the request and performance of allocation of an instance and the loading of a user-provided data image into such an instance.

The internally exposed interface part 613 is visible and made available to internal components and/or functions IP of the computer server device 690, and in particular indirectly to at least one tamper-protected computer module 80 of said type. The internally exposed interface part 613 is further arranged to communicate, digitally and electronically, with other physical tamper-protected computer modules 80, each corresponding to a respective one or more of said virtual computer devices. The internally exposed interface part 613 is arranged to relate said services to a hardware computer resource, in the form of the module 80. The externally exposed interface part 611, on the other hand, relate said services to software computer resources, in the form of logical virtualized instances corresponding to the hardware resources to which the internally exposed interface part 613 relates said services.

Furthermore, the digital computer interface 610 further comprises a virtualization part 612, providing the link between said internally 613 and externally 611 exposed interface parts, and being arranged to receive, via said externally exposed interface part 611, calls directed to any one of said virtual computer devices, to produce corresponding calls to a corresponding tamper-protected computer module 80 in question and to deliver, via said internally exposed interface part 613, such corresponding calls to the corresponding tamper-protected computer module 80 in question. The production of corresponding calls, in this context, may mean protocol translations of such calls; the computational handling of such calls, including the spawning of resulting actions and corresponding request calls; internal data information processing; and/or any other related task, as the case may be. Hence, the interface 610 may for instance implement an abstraction layer, so that more abstract calls from said external parties EP result in more detailed, concrete calls to said internal parties IP.

In general, and for both said computer software program and said interface 610, it is noted that the communication back and forth to the tamper-protected computer module 80 in question can in effect be communication back and forth to a corresponding IPM 128 and/or an instance currently running inside such an IPM 128, such as has been described above.

In general, the said digital computer interface 610 may be implemented as a software product arranged to be executed on the server control unit 600.

More particularly, the server control unit 600 may transparently expose the computer resources of the tamper-protected computer modules 80 as virtual machines to the cloud infrastructure 650, and may also expose cloud 650 resources to modules 80, while isolating modules 80 from each other as described above, and also from unauthorized cloud 650 resources.

In an example, on startup, the server control unit 600 may isolate all the modules 80 from each other at the network layer, by configuring the communication hub or network ports they are connected to. Hence, if the modules 80 are connected to a communication hub 620 in turn connected to or comprised in the server control unit 600, the server control unit 600 may configure the communication hub 620 to isolate all the modules 80 in separate VLAN groups, and may identify received packets by inspecting VLAN tags. If the modules 80 are connected to separate network ports on the server control unit 600 or the communication hub 620, the server control unit 600 may disable routing between the ports. In addition, in both cases, each port (physical or virtual), may be isolated into its own network namespace.

The server control unit 600 may further expose to the cloud 650 a list of available modules 80, their types (CPU family, speed, cores, RAM), allocation status (which barebone, hosted or shared instances are allocated to which modules 80), health and security status (on/off, unresponsive, tampered/secure).

The exposed digital virtualization interface 610, which may be a standard hypervisor API as described above, may allow the cloud 650 to seamlessly and transparently (without being aware of the fact that the computer server device 690 is not a conventional software hypervisor) allocate a cloud instance by sending a request to the server control unit 600 with the following information:
- Module 80 on which to allocate
- tenant networks to which module 80 should be connected
- images that should be booted
- allocation mode
- disks to export to the module 80

The server control unit 600 may then take all this information, verify the module 80 that is to be used and may then perform the following steps:
- set up L2 routing of the module 80 to the tenant network in question (such as through the use of network bridges, tap devices, OVS ports and OVS routing rules)
- download the provided images
- connect to remote cloud disks Then, over the module 80 isolated network connection, the server control unit 600 may perform the following steps:
- export the images, using for example HTTP or TFTP protocols, to the module 80
- re-export from the cloud remote disks
- export server control unit 600 local disk storage to the module 80
- set up DHCP and TFTP according to the allocation mode in order to allow the module 80 to boot over the network
- export allocation mode information (for example instance id, available networks, images), for example as a HTTP endpoint on the server control unit 600
- reset the security state or power cycles the module 80 (which power cycling may also be performed mechanically as described above)
- cause the module 80 to boot new image All of the exported services are specific to the allocated module 80, and cannot be accessed by other modules 80.

The server control unit 600 may also provide a means of monitoring boot status and returning that information to the cloud 650 user, by for example availing a network syslog server to the module 80, whose messages can be then retrieved by the cloud 650 user. In addition, the server control unit 600 may log the physical serial output of the module 80, which may also be retrieved by the cloud 650 user.

The allocation mode may affect the network set up by the server control unit 600 for the module 80. For instance, in "bare" mode (see above), a module's 80 network may be connected to the allocating client user/tenant's network, and the module 80 may receive DHCP boot information from said tenant's network and download the boot images over TFTP, for example from a TFTP server running on the client's network or the server control unit 600. In "hosted" mode, the module 80 may receive DHCP boot information and images directly from the server control unit 600, and additional virtual network interfaces may be routed to the cloud 650 client/tenant's network. This allows the module 80 booted "host" operating system to boot a "guest" image and transparently connect that to the cloud 650 client/tenant's network.

Above, preferred embodiments have been described. However, it is apparent to the skilled person that many modifications can be made to the disclosed embodiments without departing from the basic idea of the invention.

For instance, above, the tamper-protected computer module 80 has been described having various anti-tamper features, both structurally and functionally. It is realized that, in some applications, even the computer server device 690 may be arranged with such anti-tamper features, that may then be applied correspondingly.

In general, everything which has been said about the apparatus aspects of the present invention is equally applicable to the method, software and interface aspects of the present invention.

Two different virtualization mechanisms have been described herein—the module virtualization interface 704, providing virtualization of individual tamper-protected computer modules 80; and the virtualization interface 610, providing access to computing resources of such modules 80 by presenting such computing resources via the virtualization interface 610 in a way which appears, to external parties, as a conventional hypervisor. It is understood that, for the virtualization interface 704, it is preferred that there is at least one virtual instance, and even more preferred that there are two or more virtual instances for one such virtualization interface 704 and one such module 80. It is further understood that, for the virtualization interface 610, there preferably is at least one, even more preferably two or more, modules 80 computing resources of which are exposed via said interface 610, or at least that the server computer device 690 comprises sockets for at least one, preferably two or more, such modules computing resources of which, when connected, can be exposed in this way by the interface 610.

Hence, the invention is not limited to the described embodiments, but can be varied within the scope of the enclosed claims.

The invention claimed is:

1. A computer server device (690) comprising:
a server control unit (600) and at least one physical connector (605) for respective physical tamper-protected computer modules (80);
wherein said tamper-protected computer modules (80) each comprise a respective tamper protected enclosure (162), a respective module control unit and a respective general- purpose programmable information processing module (128), with said module control unit and information processing module (128) both entirely enclosed by said tamper-protected enclosure (162) in question;
wherein each of said tamper-protected computer modules (80) are configured to zeroize selected information stored therein upon becoming aware of a tamper event by a tamper-detecting sensor (120);
the tamper event comprising at least one of;
an intrusion by detecting a disconnected or shorted circuit; or
a change in temperature, voltage, or resistance outside the predefined range;
wherein the server control unit (600) is arranged to expose a digital virtualization interface (610) on a network to which the computer server device (690) is connected, providing to other devices external to the computer server device (690) on said network access to a respective virtual computer device corresponding to each tamper-protected computer module (80) which is connected to the server control unit (600);
wherein the server control unit (600) is arranged to receive externally originating calls directed to each such virtual computer device, to produce corresponding calls to a corresponding tamper-protected computer module (80) and to, via said digital virtualization interface, deliver such corresponding calls to the corresponding tamper protected computer module (80) in question; and wherein the computer server device (690) is arranged to allow said other devices to cause loading of computer software code provided in connection with at least one of said externally originating calls into said such tamper-protected computer modules (80) as well as execution of the computer software code provided in connection with at least one of said externally originating calls on said such tamper-protected computer modules (80).

2. The computer server device (690) according to claim 1, wherein the digital virtualization interface (610) is a hypervisor interface or a virtual machine monitor interface.

3. The computer server device (690) according to claim 1, wherein each tamper-protected computer module (80) is arranged with a module-internal communication interface (156) arranged to be connected to the said information processing module (128) of the tamper-protected computer module (80), which is a physical information processing module, in that all external wired and digital communication provided to the information processing module (128) must pass via said module-internal interface (156), and in that the module control unit is arranged with a set of module-specific tamper protection and information protection functionality.

4. The computer server device (690) according to claim 1, wherein the computer server device (690) is arranged with a physical form factor suitable for mounting in a server rack structure.

5. The computer server device (690) according to claim 1, wherein the computer server device (690) is arranged to provide, to the at least one connected tamper-protected computer module (80), module virtualization software, in turn arranged to be executed on the tamper-protected computer module (80) in question and to therein provide a virtualized computer environment comprising at least one virtual computer device individually accessible by the server control unit (600) via a module virtualization interface (704).

6. The computer server device (690) according to claim 5, wherein the module virtualization software is arranged to be executed on the module control unit or information processing module (128) in question, and in that the virtualized computer environment is arranged to divide the information processing module (128) in question into at least one virtual computer device (702).

7. The computer server device (690) according to claim 6, wherein the module control unit is arranged to provide security related services, including at least one of witnessing and key management services, to computer code executing on the said virtual computer devices.

8. The computer server device (690) according to claim 1, wherein the server control unit (600) is arranged to provide a network communication path to each connected tamper-protected computer module (80), and/or to each virtual computer device, and also to provide network communication isolation between individual tamper-protected computer modules (80) and/or virtual computer devices.

9. The computer server device (690) according to claim 1, wherein the computer server device (690) comprises, or is arranged to be connected to, a memory area (645,660,670) of which at least one connected tamper-protected computer module (80) is allocated a respective isolated memory area part, and in that the server control unit (600) comprises functionality for providing secure access to the said isolated memory area part for the tamper-protected computer module (80) in question.

10. The computer server device (690) according to claim 1, wherein at least one of said tamper protected computer modules (80) comprises a witnessing service (140), arranged to witness state changes in the tamper-protected computer module (80) in question, and arranged to provide a digital communication interface using which the server control unit (600) can request witnessing information from the witnessing service.

11. The computer server device (690) according to claim 1, wherein the server control unit (600) is arranged to re-initialize a tamper-protected computer module (80) to a secure state, including power cycling the tamper-protected computer module (80), once a task executing on the tamper protected computer module (80) is finished and the tamper-protected computer module (80) is to be removed from the computer server device (690) or the task reallocated to a different tamper protected computer module (80).

12. The computer server system comprising a computer server device (690) according to claim 1, wherein the computer server system further comprises at least one tamper-protected computer module (80) connected to different physical connectors (605) of said computer server device (690).

13. A method for initiating a computer process in a tamper-protected environment, wherein the method comprises the steps of:
a) providing a computer server device (690) having a server control unit (600) and at least one physical connector (605) for respective physical tamper-protected computer modules (80), wherein said tamper-protected computer modules (80) each comprise a respective tamper protected enclosure (162), a respective module control unit and a respective general-purpose programmable information processing module (128), with said module control unit and information processing module (128) both entirely enclosed by said tamper-protected enclosure (162) in question, wherein each of said tamper-protected computer modules (80) are configured to zeroize selected information stored therein upon becoming aware of a tamper event by a tamper-detecting sensor (120);
the tamper event comprising at least one of;
an intrusion by detecting a disconnected or shorted circuit; or
a change in temperature, voltage, or resistance outside the predefined range;
wherein the server control unit (600) is arranged to expose a digital virtualization interface (610) on a network to which the computer server device (690) is connected, providing to other devices external to the computer server device (690) on said network access to a respective virtual computer device corresponding to each tamper-protected computer module (80) which is connected to the server control unit (600), wherein the server control unit (600) is arranged to receive externally originating calls directed to each such virtual computer device, to produce corresponding calls to a corresponding tamper-protected computer module (80) and to, via said digital virtualization interface, deliver such corresponding calls to the corresponding tamper protected computer module (80) in question, wherein the computer server device (690) is arranged to allow said other devices to cause loading of computer software code provided in connection with at least one of said externally originating calls into said such tamper-protected computer modules (80) as well as execution of the computer software code provided in connection with at least one of said externally originating calls on said such tamper-protected computer modules (80);
b) providing at least one tamper-protected computer module (80) and connecting the at least one tamper-protected computer module (80) to one of said physical connections (605);
c) receiving by the computer server device (690), via its virtualization interface (610), an allocation request from the network to which it is connected; and
d) allocating by the computer server device (690) the at least one tamper-protected computer module (80).

14. The method according to claim 13, wherein the method further comprises:
an initiation step, performed after step b), in which the computer server device (690) provides power to the tamper protected computer module (80) in question, the tamper-protected computer module (80) powers up, the tamper-protected computer module (80) sends information regarding its current state, and the computer server device (690) reads the sent information and updating a status information register regarding the tamper-protected computer module (80); and
an execution step, performed after step d), in which the computer server device (690) provides to the tamper-protected computer module (80) a digital data image (700) comprising executable software code, the tamper-protected computer module (80) loads said data image into its information processing module (128), and the information processing module (128) executes said executable software code.

15. The method according to claim 14, wherein the tamper-protected computer module (80) signs said information regarding its current state using a private PKI key, which private key is private to the tamper-protected computer module (80), and in that the computer server device (690) that reads the sent information also verifies the signature using a public PKI key corresponding to the private PKI key.

16. The method according to claim 14, wherein the said executable software code comprises a computer software program and an operating system arranged to execute the computer software program, and also a kernel arranged to allow the operating system access to hardware functionality of the information processing module (128) of the tamper-protected computer module (80).

17. The method according to claim 14, wherein the data image (700) is loaded into the information processing module (128) of the tamper-protected computer module (80) and replaces any previous data image loaded therein.

18. The method according to claim 14, wherein the data image (700) is loaded into a virtual machine (702) running on the information processing module (128) of the tamper-protected computer module (80), which virtual machine (702) is exposed to the computer server device (690) via a module virtualization interface provided by virtualization software run by the tamper-protected computer module (80).

19. The method according to claim 18, wherein the virtualization software further provides access for said executable software code to services provided by the module control unit of the tamper protected computer module (80) in question.

20. The method according to claim 13, which method is further for running a computer process, wherein the method further comprises an execution migration step, in which the data image (700) is loaded into the information processing module (128) of a different tamper-protected computer module (80), and in that the execution migration step comprises the setting up of a secure communication link between the two information processing modules (128) and the transfer, over said secure communication link, of a cryptographic key using which an encrypted memory area to which access is provided by the server control unit (600) can be decrypted.

21. The method according to claim 14, which method is further for running a computer process, wherein the method further comprises a termination part in which the tamper-protected computer module (80) is re-initialized to a secure state, including by a power cycling step.

22. A non-transitory computer readable medium storing a software program that is executable on a computer server device having at least one general-purpose programmable tamper-protected computer module (80), with said at least one general-purpose programmable tamper-protected computer module (80) comprising a respective tamper protected enclosure (162), a respective module control unit and a respective general- purpose programmable information processing module (128), with said module control unit and information processing module (128) both entirely enclosed by said tamper-protected enclosure (162) in question, with said at least one general-purpose programmable tamper-protected computer module (80) configured to zeroize selected information stored therein upon becoming aware of a tamper event by a tamper-detecting sensor (120);
the tamper event comprising at least one of;
an intrusion by detecting a disconnected or shorted circuit; or
a change in temperature, voltage, or resistance outside the predefined range;
the software program including functionality for communicating with said at least one general-purpose programmable tamper-protected computer module (80), each connected to the computer server device (690) via a respective physical connection (605) and each additionally comprising a respective module control unit and a respective information processing module (128), the software program comprising instructions executable to:
expose a digital virtualization interface (610) on a network to which the computer server device (690) is connected, providing for other devices external to the computer server device (690) on said network access to a respective virtual computer device corresponding to each of the said tamper-protected computer modules (80);
receive externally originating calls directed to each such virtual computer device, to produce corresponding calls to a corresponding tamper-protected computer module (80) and to deliver such corresponding calls to the corresponding tamper-protected computer module (80) in question; and
allow said other devices to cause loading of computer software code provided in connection with said externally originating calls into said such tamper-protected computer modules (80) as well as execution of the computer software code provided in connection with said externally originating calls on said such tamper-protected computer modules (80).

23. An interface system, comprising:
at least one physical tamper-protected general-purpose programmable computer module (80) each corresponding to a virtual computer device, wherein the at least one physical tamper-protected general-purpose programmable computer module (80) is configured to zeroize selected information stored therein upon becoming aware of a tamper event by a tamper-detecting sensor (120);

the tamper event comprising at least one of;
- an intrusion by detecting a disconnected or shorted circuit; or
- a change in temperature, voltage, or resistance outside the predefined range;

a digital computer interface, wherein the digital computer interface comprises an externally exposed interface part (611), arranged to provide, to external parties (EP), communication services relating to computer resources performed by at least one virtual computer device, and an internally exposed interface part (613), arranged to communicate with the at least one physical tamper-protected general-purpose programmable computer module (80); wherein the digital computer interface further comprises a virtualization part (612), arranged to receive, via said externally exposed interface part (611), externally originating calls directed to any one of said virtual computer devices, to produce corresponding calls to a corresponding tamper-protected computer module (80) in question and to deliver, via said internally exposed interface part (613), such corresponding calls to the corresponding tamper-protected computer module (80) in question; wherein the digital computer interface is arranged to allow said other devices to cause loading of computer software code provided in connection with said externally originating calls into said such tamper-protected computer modules (80) as well as execution of the computer software code provided in connection with said externally originating calls on said such tamper- protected computer modules (80).

\* \* \* \* \*